United States Patent
Harvey et al.

(10) Patent No.: US 7,861,251 B2
(45) Date of Patent: Dec. 28, 2010

(54) GENERATING KEYS FOR OBJECTS IN A WEB SERVICES ARRANGEMENT

(75) Inventors: Richard Harvey, Ringwood (AU); Timothy Bentley, Fitzroy (AU)

(73) Assignee: Computer Associates Think, Inc., Islandia, NY (US)

( * ) Notice: Subject to any disclaimer, the term of this patent is extended or adjusted under 35 U.S.C. 154(b) by 891 days.

(21) Appl. No.: 10/648,580

(22) Filed: Aug. 25, 2003

(65) Prior Publication Data

US 2004/0202330 A1 Oct. 14, 2004

Related U.S. Application Data

(60) Provisional application No. 60/406,391, filed on Aug. 26, 2002, provisional application No. 60/406,399, filed on Aug. 26, 2002, provisional application No. 60/406,325, filed on Aug. 26, 2002, provisional application No. 60/406,328, filed on Aug. 26, 2002, provisional application No. 60/406,204, filed on Aug. 26, 2002, provisional application No. 60/406,205, filed on Aug. 26, 2002, provisional application No. 60/406,319, filed on Aug. 26, 2002.

(51) Int. Cl.
*G06F 9/46* (2006.01)
*G06F 9/44* (2006.01)
(52) U.S. Cl. ............... 719/316; 719/330; 707/741
(58) Field of Classification Search ......... 719/315, 719/316, 330
See application file for complete search history.

(56) References Cited

U.S. PATENT DOCUMENTS

| | | | |
|---|---|---|---|
| 5,956,499 A | 9/1999 | Colgan | 395/500.23 |
| 6,003,039 A | 12/1999 | Barry et al. | 707/103 |
| 6,085,188 A | 7/2000 | Bachmann et al. | 707/3 |
| 6,202,066 B1 | 3/2001 | Barkley et al. | |
| 6,236,988 B1 | 5/2001 | Aldred | 707/3 |
| 6,272,537 B1 | 8/2001 | Kekic et al. | |
| 6,366,954 B1 | 4/2002 | Traversat et al. | 709/220 |
| 6,554,183 B1 | 4/2003 | Sticha et al. | 235/379 |
| 6,571,232 B1 | 5/2003 | Goldberg et al. | |
| 6,752,313 B1 | 6/2004 | Caviles et al. | 235/375 |
| 6,834,286 B2 | 12/2004 | Srinivasan et al. | 707/103 |
| 6,947,951 B1 | 9/2005 | Gill | |
| 6,976,027 B2 | 12/2005 | Cutlip | 707/101 |
| 6,981,265 B1 * | 12/2005 | Rees et al. | 719/313 |
| 6,985,905 B2 | 1/2006 | Prompt et al. | 707/102 |

(Continued)

FOREIGN PATENT DOCUMENTS

WO WO 02/03245 1/2002

OTHER PUBLICATIONS

B. Bergeson and K. Boogert, "LDAP Schema for UDDI," May 2002, p. 1-23.*

(Continued)

*Primary Examiner*—Li B Zhen
(74) *Attorney, Agent, or Firm*—Baker Botts L.L.P.

(57) ABSTRACT

A method of generating keys for object(s) in a Web Services arrangement, includes determining if an object has a defined first key and if the object has a defined first key, providing that defined first key for the object and if the object does not have a defined first key, providing a second key for the object.

10 Claims, 14 Drawing Sheets

U.S. PATENT DOCUMENTS

| | | | |
|---|---|---|---|
| 7,016,893 | B2 | 3/2006 | Boreham et al. ............... 707/3 |
| 7,016,976 | B2* | 3/2006 | Merrells et al. ............. 709/245 |
| 7,047,259 | B1* | 5/2006 | Chasman et al. ............ 707/203 |
| 7,054,858 | B2 | 5/2006 | Sutherland |
| 7,114,154 | B1 | 9/2006 | Crohn ........................ 718/100 |
| 7,136,835 | B1 | 11/2006 | Flitcroft et al. ............... 705/39 |
| 7,200,869 | B1 | 4/2007 | Hacherl et al. |
| 7,296,061 | B2 | 11/2007 | Martinez et al. |
| 2001/0052113 | A1 | 12/2001 | Hearne et al. ............... 717/106 |
| 2002/0019827 | A1 | 2/2002 | Shiman et al. ............. 707/200 |
| 2002/0046286 | A1 | 4/2002 | Caldwell et al. ............ 709/229 |
| 2002/0062259 | A1 | 5/2002 | Katz et al. |
| 2002/0073396 | A1 | 6/2002 | Crupi et al. .................. 717/104 |
| 2002/0124003 | A1 | 9/2002 | Rajasekaran et al. |
| 2002/0161745 | A1 | 10/2002 | Call ............................. 707/1 |
| 2002/0174117 | A1 | 11/2002 | Nykanen ........................ 707/4 |
| 2003/0005181 | A1* | 1/2003 | Bau et al. ................... 709/330 |
| 2003/0023957 | A1* | 1/2003 | Bau et al. ................... 717/140 |
| 2003/0110242 | A1* | 6/2003 | Brown et al. ................ 709/222 |
| 2003/0126136 | A1 | 7/2003 | Omoigui ...................... 707/10 |
| 2003/0135584 | A1 | 7/2003 | Roberts ....................... 709/218 |
| 2003/0187839 | A1 | 10/2003 | Zhang et al. .................... 707/4 |
| 2003/0200199 | A1 | 10/2003 | Snyder |
| 2003/0217140 | A1* | 11/2003 | Burbeck et al. ............. 709/224 |
| 2003/0236956 | A1 | 12/2003 | Grubbs et al. ............... 711/162 |
| 2004/0002955 | A1 | 1/2004 | Gadbois et al. ................ 707/2 |
| 2004/0030771 | A1 | 2/2004 | Strassner .................... 709/224 |
| 2004/0039738 | A1 | 2/2004 | Cutlip ........................... 707/5 |
| 2004/0059722 | A1 | 3/2004 | Yeh et al. ....................... 707/3 |
| 2004/0064411 | A1 | 4/2004 | Tsui et al. ..................... 705/40 |
| 2004/0204958 | A1 | 10/2004 | Perkins et al. |
| 2004/0213409 | A1 | 10/2004 | Murto et al. ................ 380/258 |
| 2005/0021348 | A1 | 1/2005 | Chan ............................ 705/1 |
| 2005/0149394 | A1 | 7/2005 | Postrel ........................ 705/14 |
| 2005/0182781 | A1 | 8/2005 | Bouvet ....................... 707/102 |
| 2005/0209984 | A1 | 9/2005 | Brown et al. .................... 707/1 |
| 2005/0262227 | A1 | 11/2005 | Heller et al. ................ 709/223 |
| 2006/0059107 | A1 | 3/2006 | Elmore et al. ................. 705/64 |
| 2006/0143229 | A1 | 6/2006 | Bou-Ghannam et al. . 707/104.1 |
| 2008/0109897 | A1 | 5/2008 | Moran et al. .................. 726/19 |

OTHER PUBLICATIONS

"The Common Object Request Broker: Architecture and Specification," Object Management Group, Revision 2.0, XP-002308138, http://www.omg.org/cgi-bin/apps/doc?formal/97-02-25.ps>, title page plus p. 12-4—p. 12-14 (section 12.3), Jul. 1995.

PCT Search Report for PCT/US 03/26525, 8 pages, Dec. 9, 2004.

LDAP Functions, http://www.phpdig.net/ref/rn33.html, 3 pages, Apr. 10, 2007.

USPTO Office Action Summary for U.S. Appl. No. 10/648,143, 8 pages, Apr. 4, 2008.

USPTO Office Action Summary for U.S. Appl. No. 10/648,140, 9 pages, May 15, 2008.

USPTO Office Action Summary for U.S. Appl. No. 10/648,595, 13 pags, May 16, 2008.

PCT Written Opinion from the International Preliminary Examining Authority, Intl. Application No. PCT/US03/26528, 5 pages, Jun. 16, 2008.

USPTO Office Action Summary for U.S. Appl. No. 10/648,606; 17 pages, Jun. 2, 2008.

USPTO Office Action; U.S. Appl. No. 10/648,145; filed date Aug. 25, 2003, Feb. 23, 2009.

USPTO Office Action Summary; U.S. Appl. No. 10/932,696; Filed Date: Sep. 2, 2004; Inventor: Harvey et al.; Oct. 16, 2008.

MySQL Reference Manual for Version 3.23.5-alpha.; web.archive.org/web.20010224112821;tecfa.unige.ch/guides/mysql/man/manuel_Literlas.html; pp. 1-4, Feb. 24, 2001.

Australian Government; Examiner's first report on patent application No. 2003265651, Nov. 5, 2008.

Australian Government; Examiner's first report on patent application No. 2003265652, Nov. 3, 2008.

Australian Government; Examiner's first report on patent application No. 2003265650, Oct. 31, 2008.

Australian Government; Examiner's first report on patent application No. 2003270003, Nov. 3, 2008.

Australian Government; Examiner's first report on patent application No. 2003265649, Nov. 17, 2008.

Australian Government; Examiner's first report on patent application No. 2003265762, Nov. 10, 2008.

Australian Government; Examiner's first report on patent application No. 2003268188, Nov. 10, 2008.

Correspondence regarding U.S. Appl. No. 03 793 366.0-1243, Reference No. HCD/J00047315EP; Communication Pursuant to Article 94(3) EPC received from EPO, Examiner Jan Gerhard Wiltink, dated Jun. 29, 2009, Jun. 29, 2009 (Received Aug. 6, 2009).

USPTO Office Action Summary for U.S. Appl. No. 10/932,696; 16 pages; dated Apr. 11, 2008.

USPTO Office Action Summary for U.S. Appl. No. 10/648,606; 18 pages; dated Mar. 17, 2009.

USPTO Office Action; U.S. Appl. No. 10/648,143; Filed Aug. 25, 2003; Inventor: Harvey; Apr. 1, 2009.

USPTO Office Action for U.S. Appl. No. 10/648,606, 18 pages, dated Sep. 1, 2009.

USPTO Office Advisory Action for U.S. Appl. No. 10/648,145; 3 pages; dated Nov. 5, 2009.

USPTO Office Action U.S. Appl. No. 10/648,143; 10 pages; dated Nov. 4, 2009.

USPTO Office Action for U.S. Appl. No. 10/648,145; 13 pages, dated Sep. 8, 2009.

USPTO Examiner's Answer for U.S. Appl. No. 10/932,696, 17 pages, dated Jun. 3, 2009.

USPTO Office Advisory Action for U.S. Appl. No. 10/648,145; 13 pages; dated Jan. 22, 2010.

*USPTO Advisory Action*, U.S. Appl. No. 10/648,606, filed Aug. 25, 2003, by Richard Harvey et al., 4 pages, Notification Date May 14, 2010.

*USPTO Final Office Action*, U.S. Appl. No. 10/648,145, filed Aug. 25, 2003, by Richard Harvey et al., 18 pages, Notification Date Jun. 21, 2010.

*USPTO Advisory Action*, U.S. Appl. No. 10/648,606, filed Aug. 25, 2003, by Richard Harvey et al., 2 pages, Notification Date Jul. 28, 2010.

*USPTO Advisory Action*, U.S. Appl. No. 10/648,145, filed Aug. 25, 2003, by Richard Harvey et al., 4 pages, Notification Date Aug. 18, 2010.

* cited by examiner

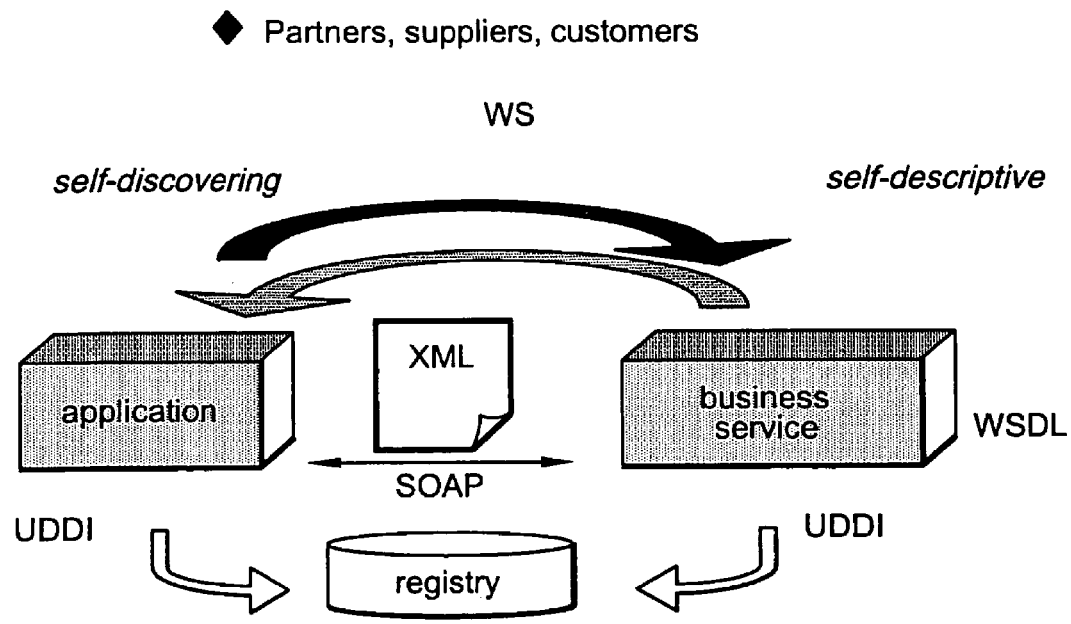
Web Services Related Art
FIG. 1a
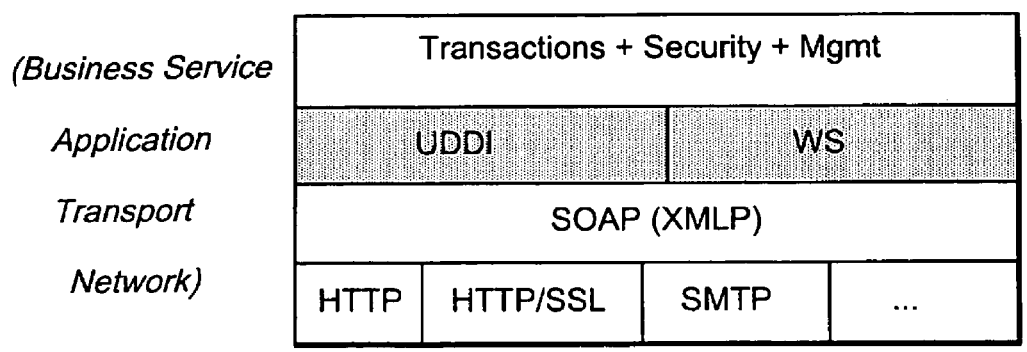
WS Protocol Stack Related Art
FIG. 1b

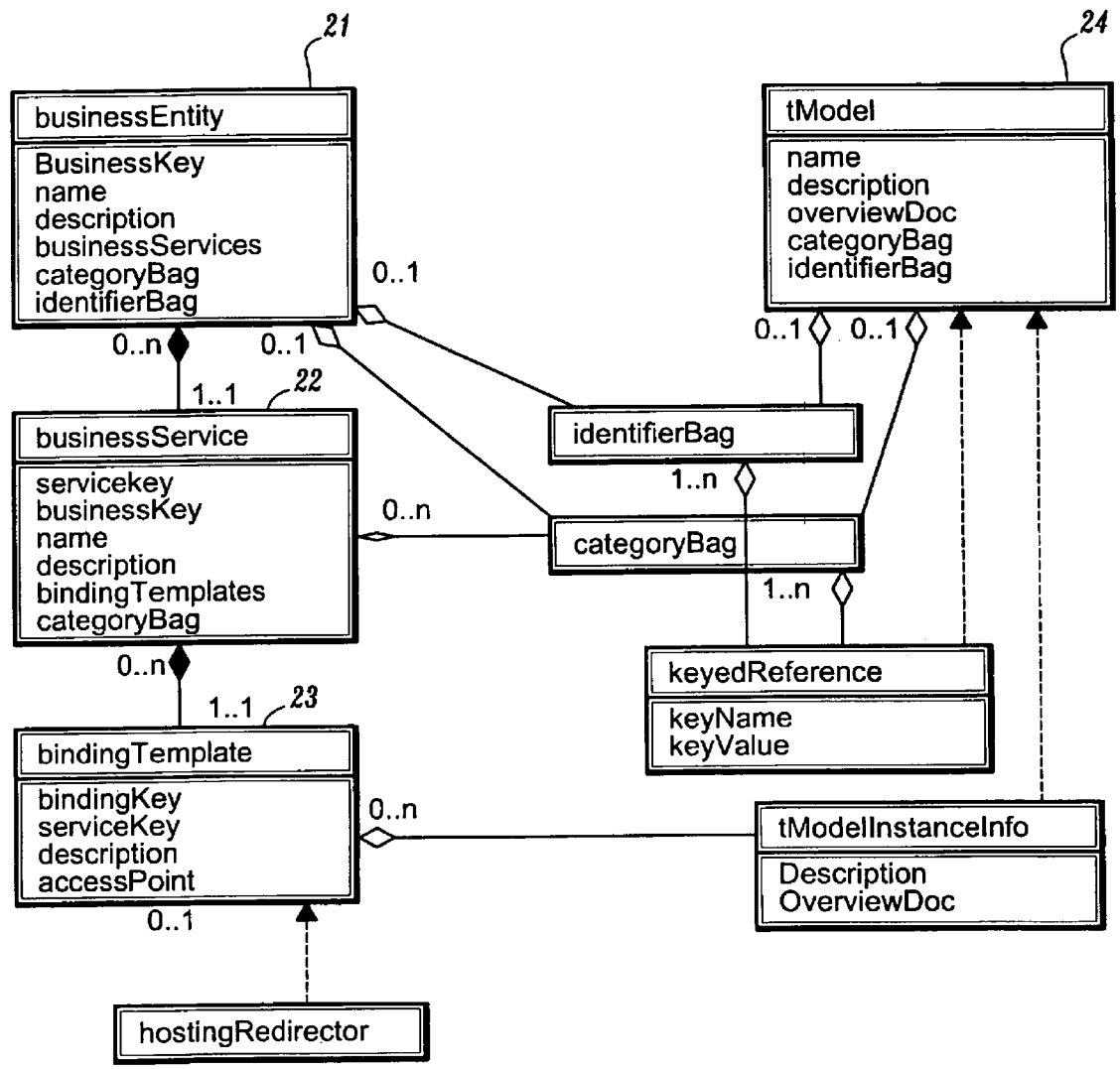
Related Art
FIG. 2

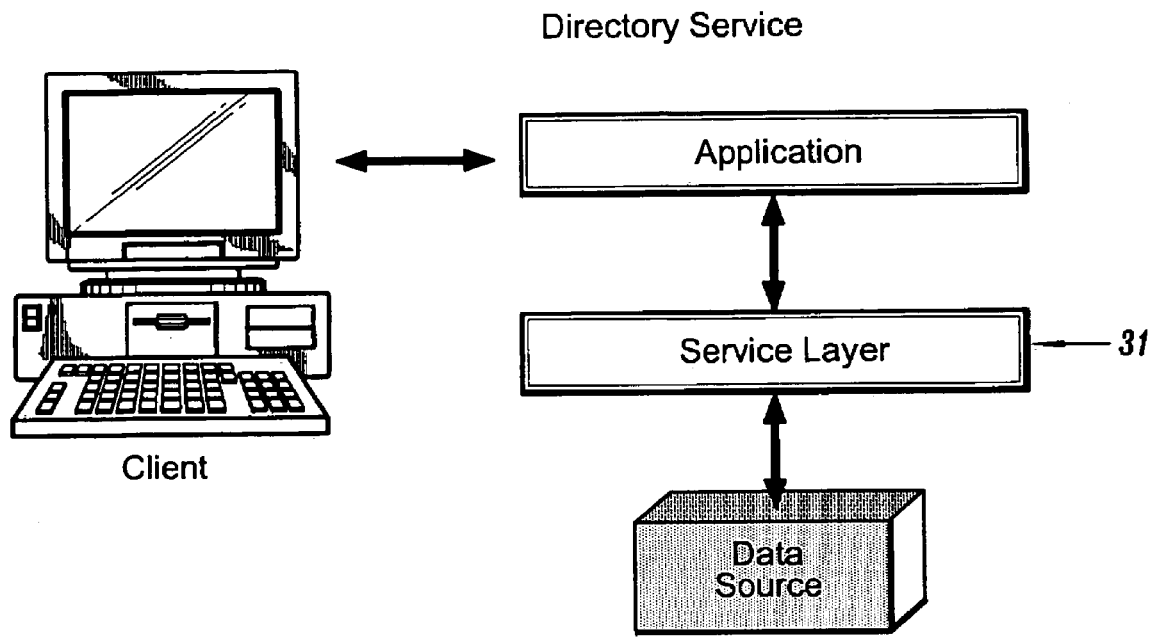
Related Art
FIG. 3
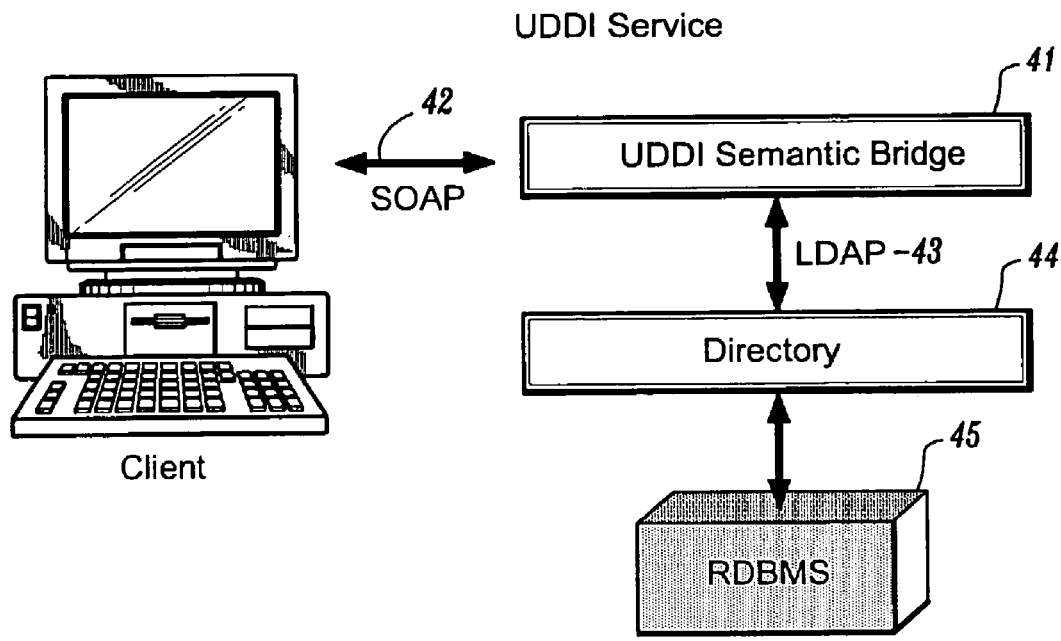
FIG. 4

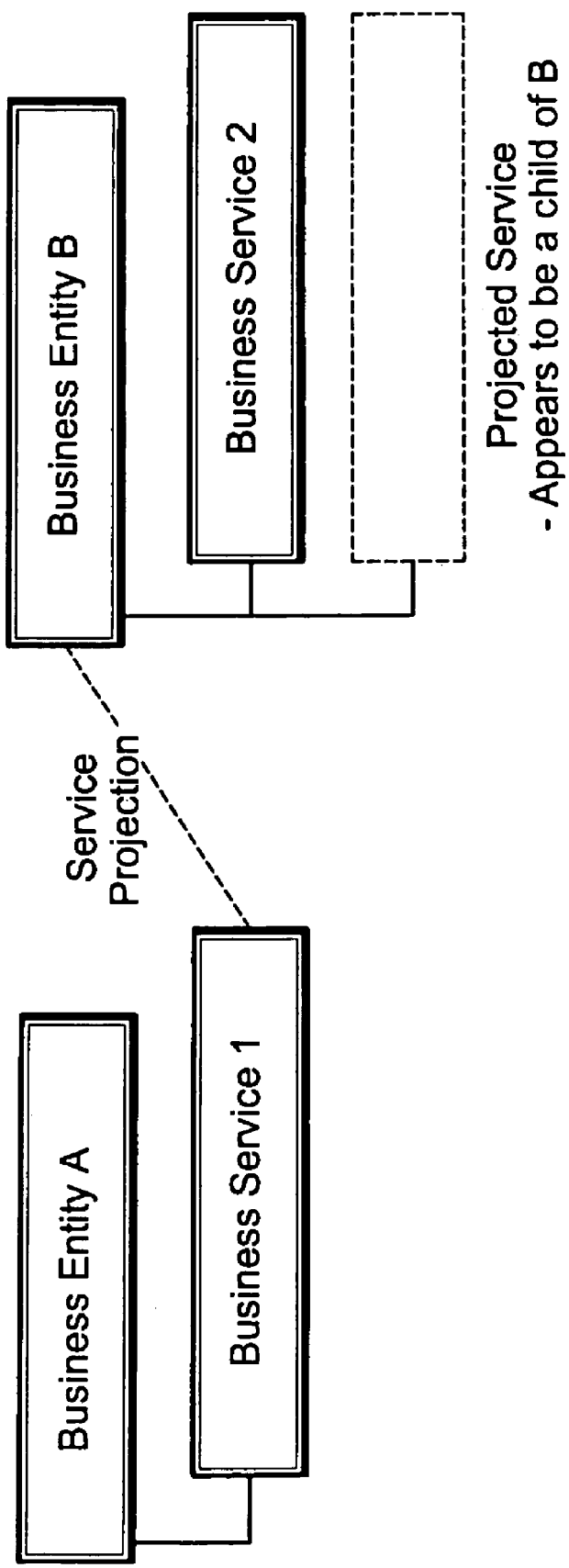
FIG. 5

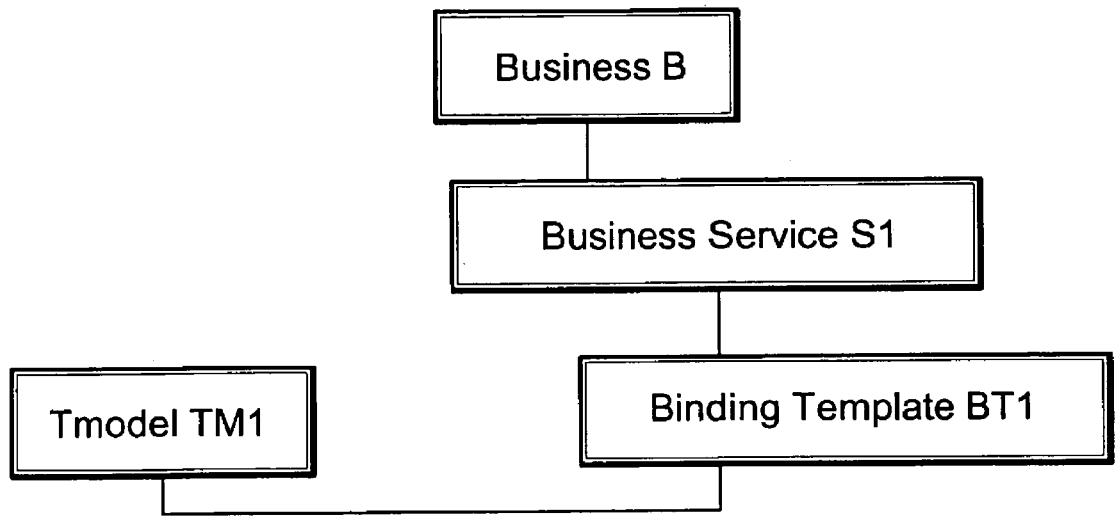
Binding Template/Tmodel relationship
FIG. 6
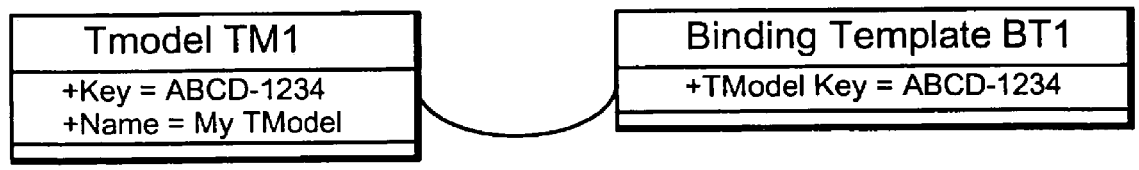
Primary & Foreign Keys
FIG. 7

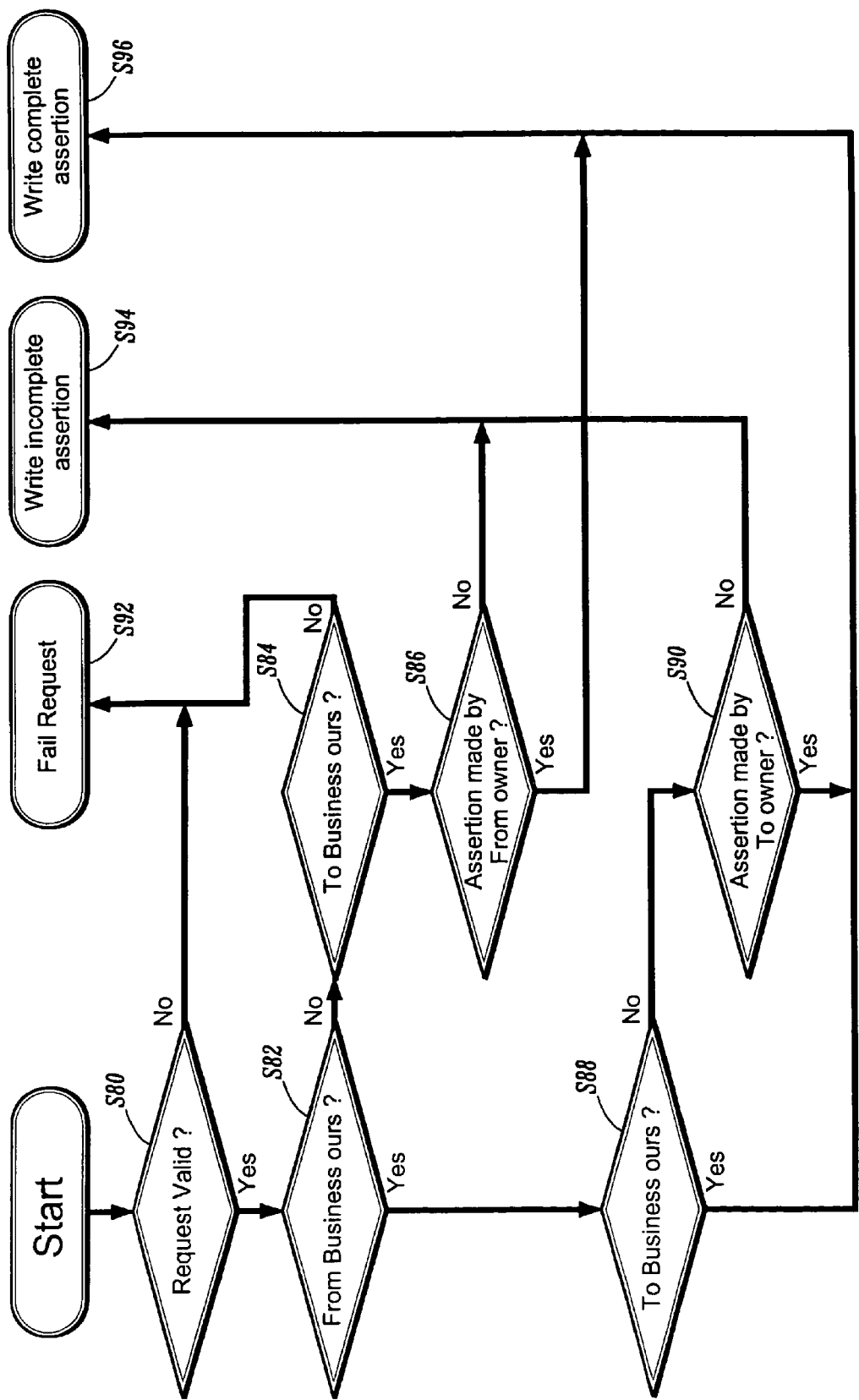
FIG. 8

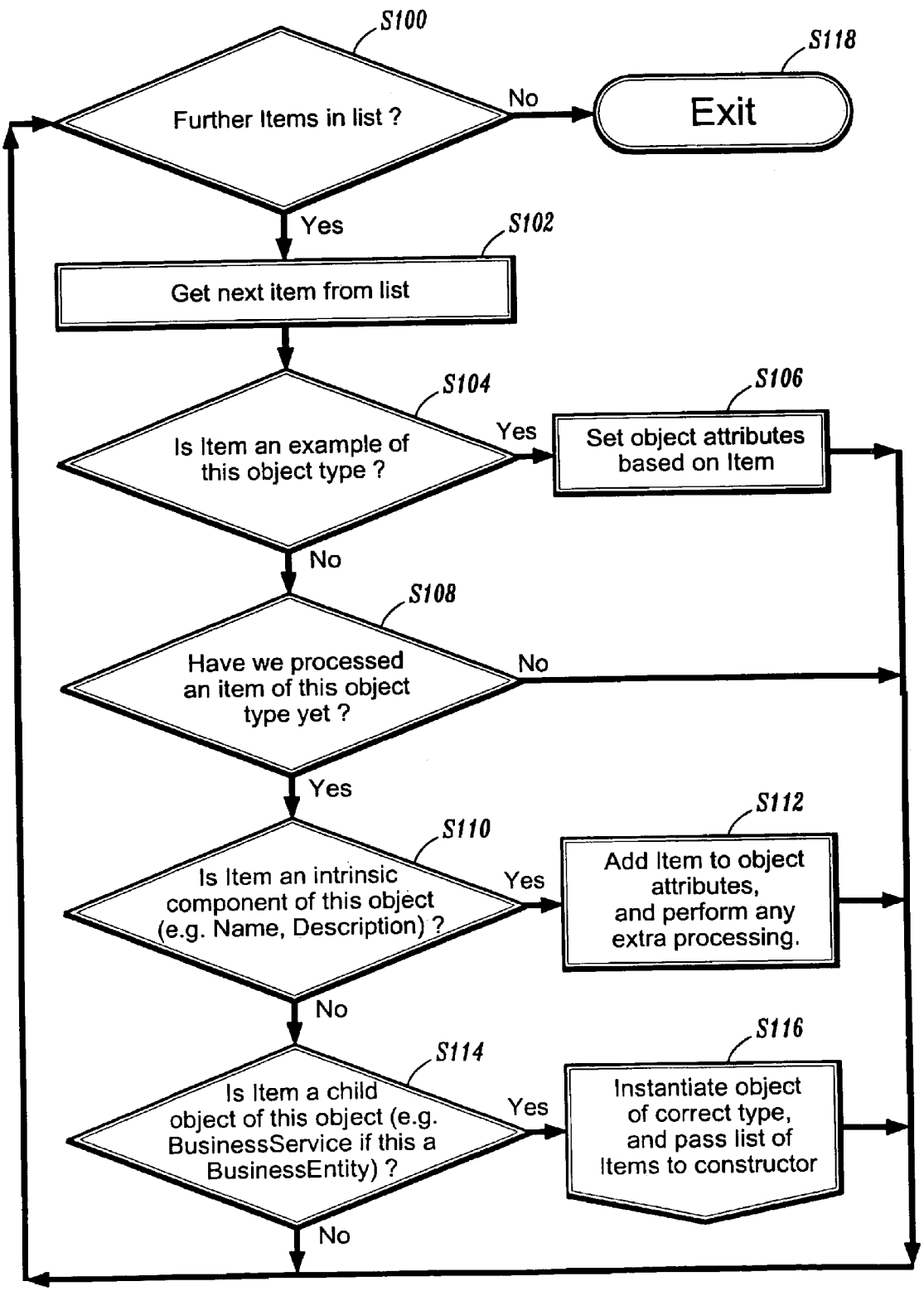
FIG. 9

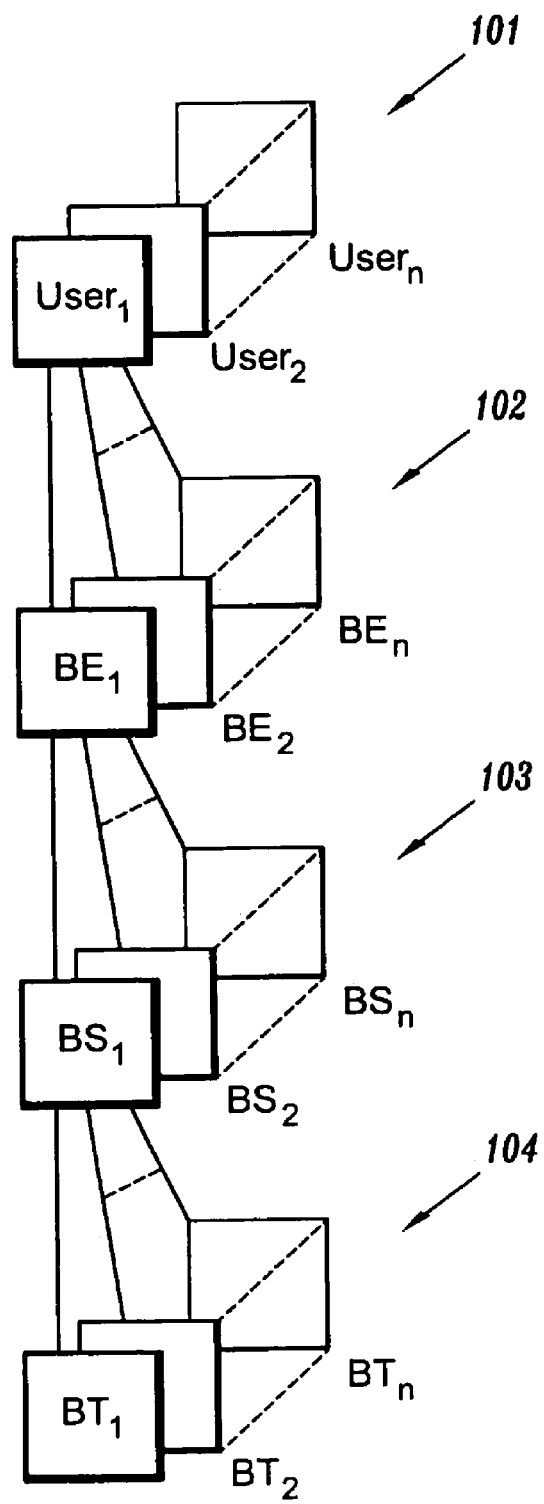
FIG. 10

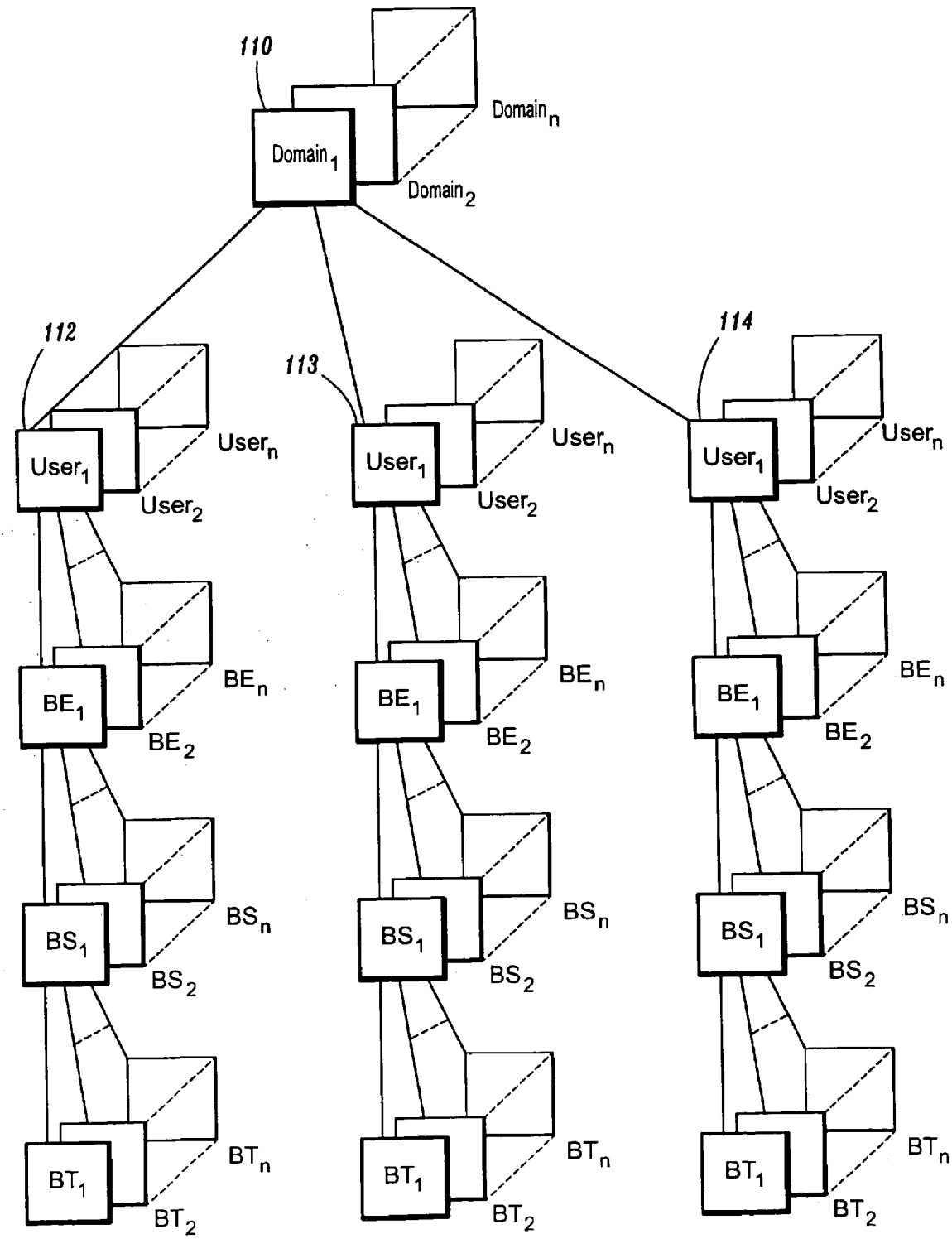
FIG. 11

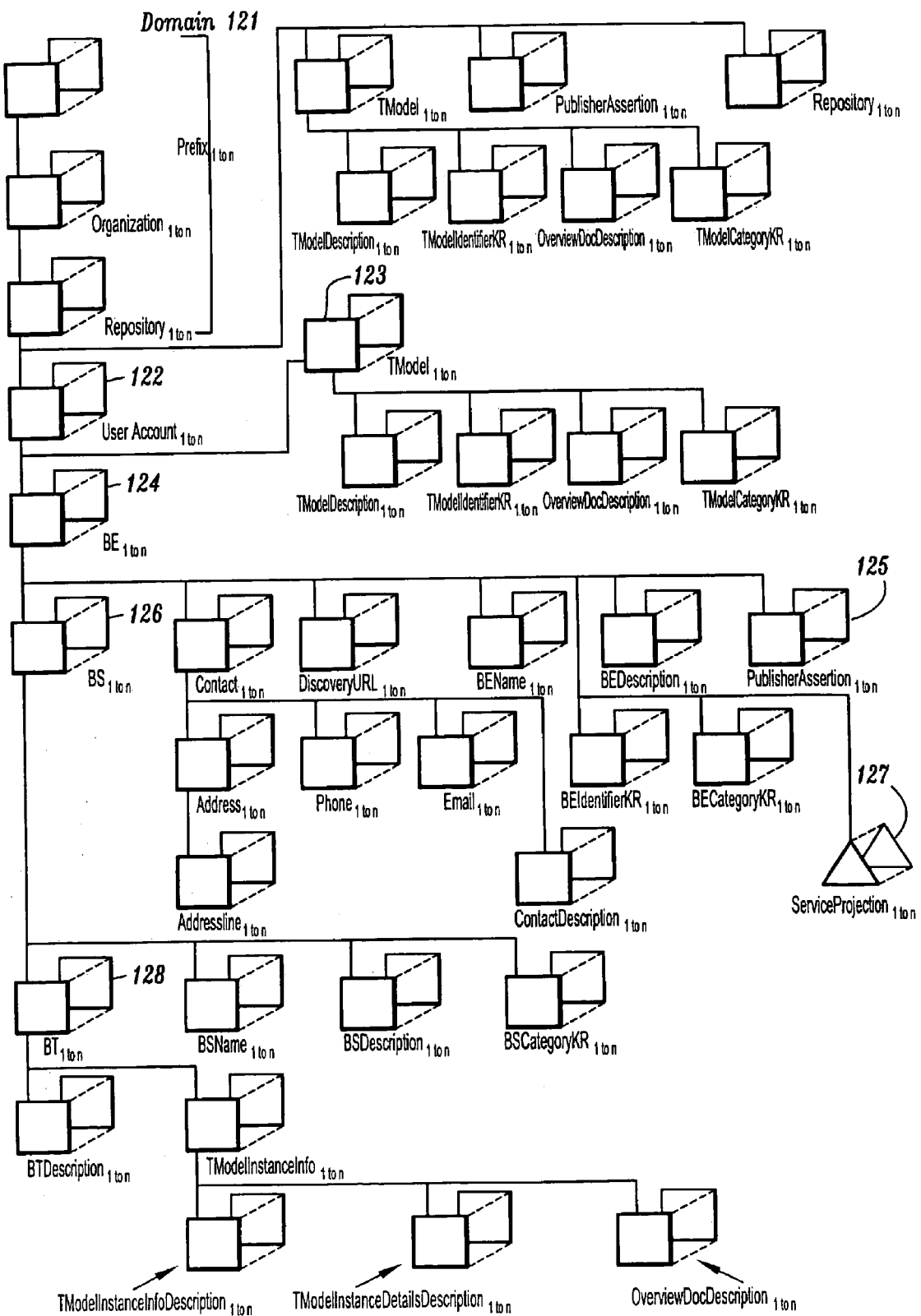
FIG. 12

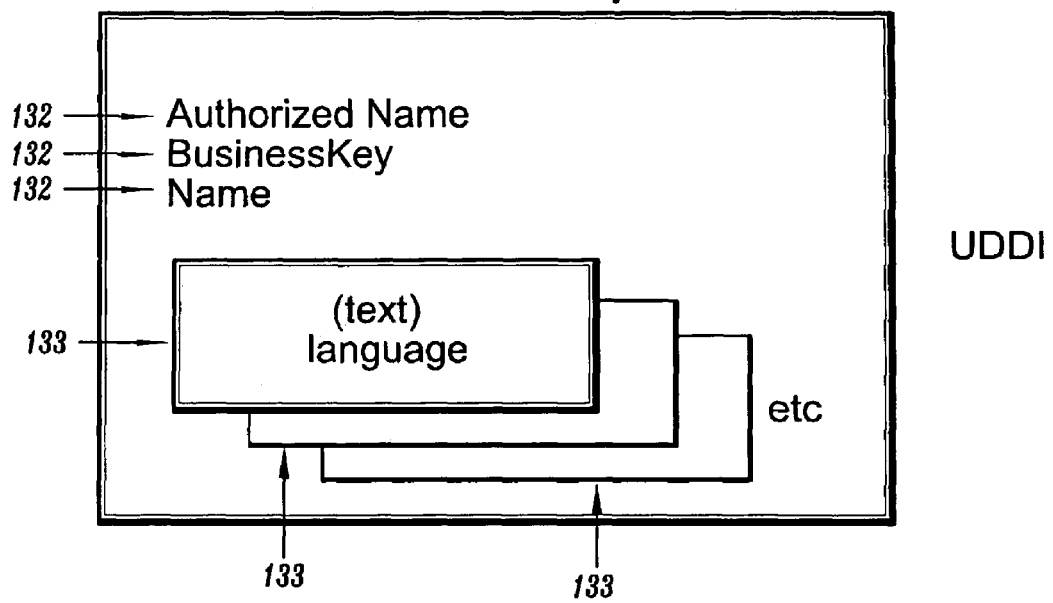
(Prior Art)
FIG. 13
(Prior Art)
FIG. 14

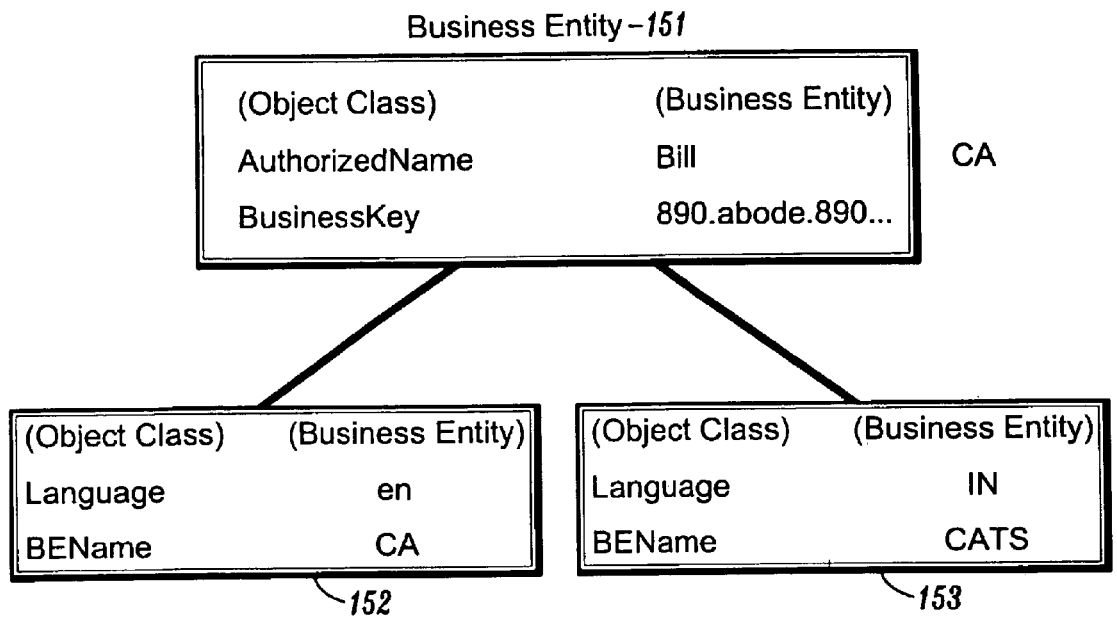
FIG. 15
UDDI Relationship Diagram
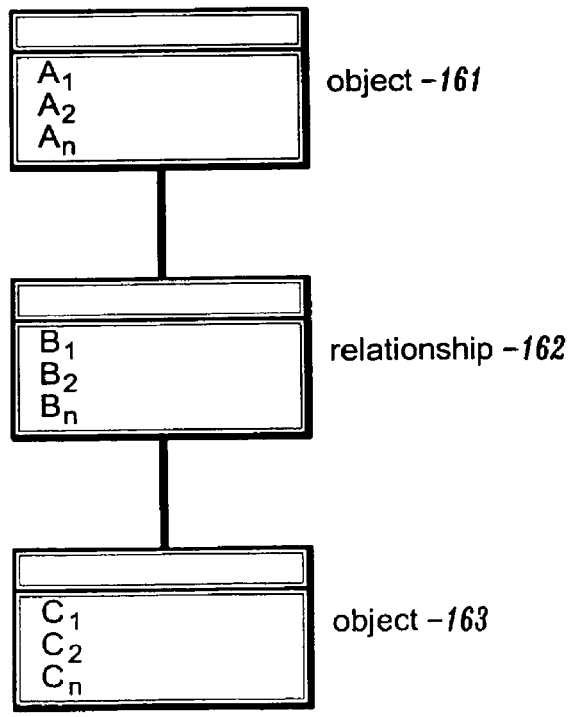
FIG. 16

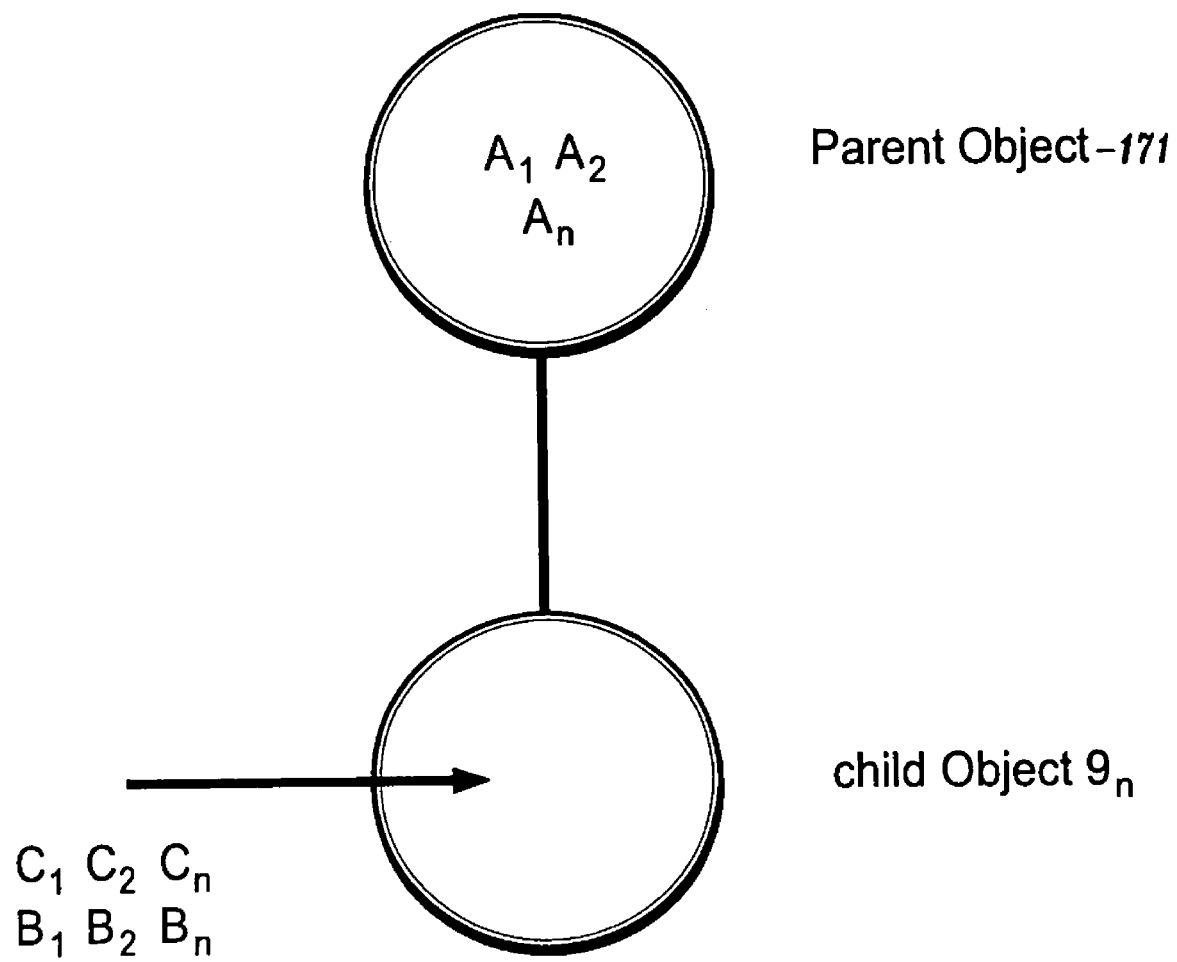
FIG. 17

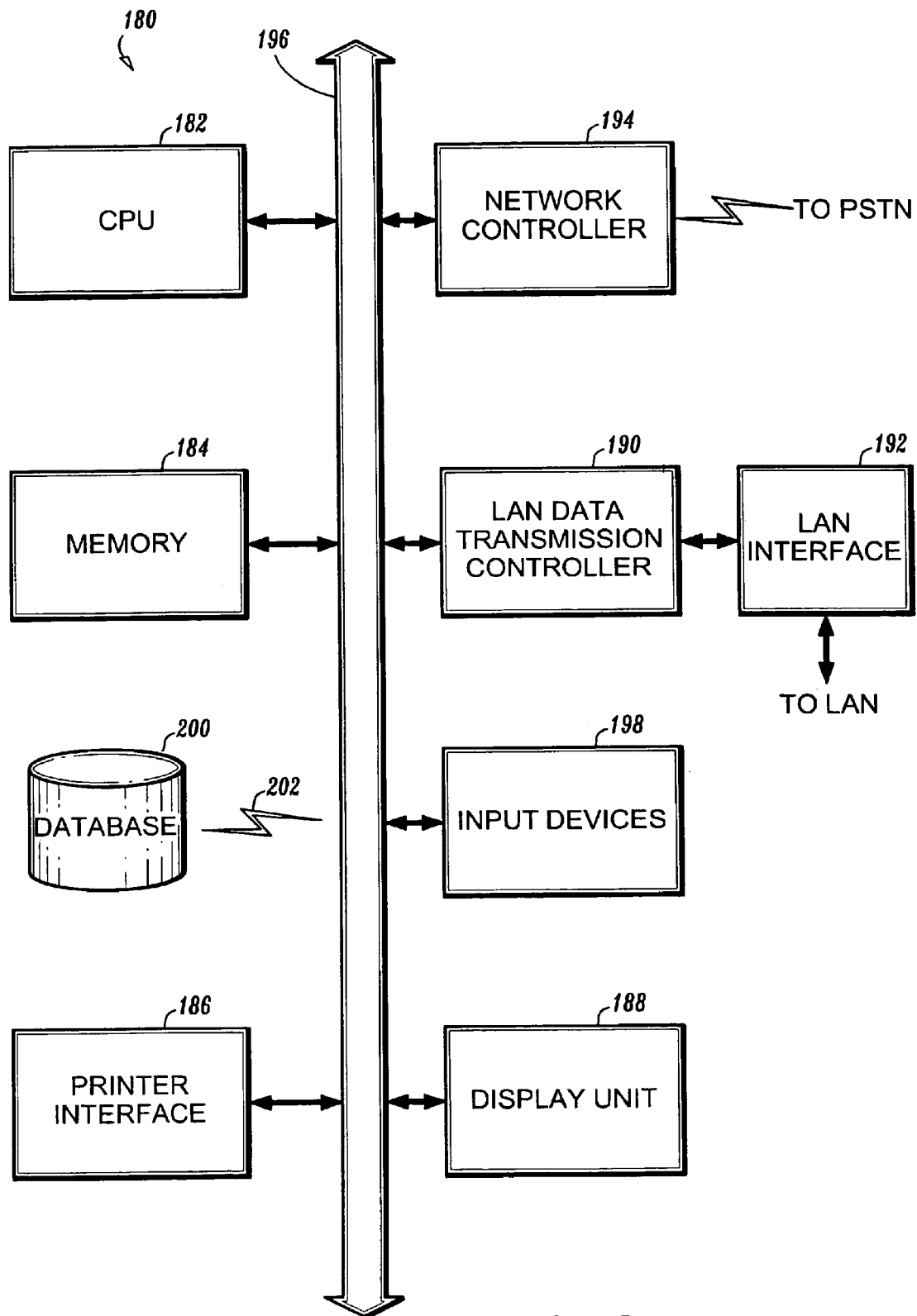
FIG. 18

GENERATING KEYS FOR OBJECTS IN A WEB SERVICES ARRANGEMENT

CROSS REFERENCE TO RELATED APPLICATIONS

The present application claims the benefit of Provisional Applications Ser. Nos. 60/406,391; 60/406,399; 60/406,325; 60/406,328; 60/406,204; 60/406,205; and 60/406,319 each of which was filed on Aug. 26, 2002 and the contents of each of which are incorporated herein by reference.

COMPUTER PROGRAM LISTING APPENDIX

The present application includes a computer program listing appendix entitled "Appendix A.pdf" (Created Nov. 2, 2007; 814 Kilobytes) on a single compact disk, which is hereby incorporated by reference.

BACKGROUND

1. Field

The present disclosure relates to UDDI Registry and Web Services in general, and in particular to method(s), apparatus and system(s) used in giving practical effect to such services.

2. Description of Related Art

UDDI (Universal Description, Discovery and Integration) is a set of Standards that have been defined to enable applications that use Web Services to quickly, easily and dynamically interact with one another. UDDI is intended to create a platform-independent, open framework for describing services, discovering businesses and integrating system services using the Internet, as well as an operational registry.

A UDDI registry provides valuable support to systems structured using Web Services. FIG. 1a illustrates schematically basic Web Services and UDDI concepts. FIG. 1b illustrates schematically a simplified protocol stack for the Web Services environment. UDDI provides a repository for Web Services information and is itself provided by way of a Web Service.

UDDI enables applications to publish how they want to interact on the web. Each 'Web Service' is a self-describing, self-contained, modular unit of application logic that provides some system functionality to other applications through an Internet connection. Applications access Web Services via ubiquitous web protocols and data formats, with no need to worry about how each Web Service is implemented. Web Services can be mixed and matched with other Web Services to execute a larger workflow or business transaction.

The UDDI Standards describe a specific-purpose repository that is intended to manage descriptions of Web Service types, business organizations, and details about how to invoke the Web Services. The Standards do not necessarily specify how the Standards should be implemented, nor whether the implementation should include storage using a database, a Directory or any other medium.

At a web site hosted by the organisation responsible for the UDDI Standards there are a number of Frequently Asked Questions (FAQ). One of these questions is: "Can a UDDI registry be built or based on LDAP?" In answer, this web site discloses that there is no formal relationship between UDDI and Directories. "The UDDI specification does not dictate registry implementation details. The UDDI specification defines an XML-based data model and a set of SOAP APIs to access and manipulate that data model. The SOAP APIs define the behaviour a UDDI repository exhibits. A UDDI implementation could be built on an LDAP Directory as long as it conforms to the specified behaviour. Thus far, all UDDI implementations have been built on relational databases."

It is to be noted that Directory technologies, such as X.500 and LDAP, are extensible, general-purpose data stores and their associated languages that are most often used to manage users and resources. They are very well established technologies, widely adopted, and considered very stable and reliable.

However, implementing the UDDI Standards on a Directory requires the solving of a number of problems. The UDDI Standards leave many important issues unaddressed, such as:

The UDDI Standard defines a number of objects, some of which are related by a hierarchy, but UDDI does not define an all-encompassing hierarchy. For example. Business Service objects will come under Business Entity objects, and the Binding Template objects will come under Business Services. FIG. 2 illustrates an example of this hierarchy. Business Entity objects are denoted 21, Business Services objects are denoted 22, and Binding Template objects are denoted 23. It is also to be noted that TModel objects, denoted 24, for example, are not hierarchically related to these objects. There are also other concepts such as Publisher Assertions, for example, which are not defined hierarchically.

creating an efficient implementation of the requirement that a user be permitted to alter only those objects under his/her control, creating an efficient implementation that would allow UDDI registries to be distributed, creating an efficient implementation which enhances aspects of management and performance of searching and update.

How to represent complex UDDI objects in a relatively efficient way. For example Business Entity, Business Service, Binding Template and/or TModel have compound repeating elements. In turn these repeating elements could contain further repeating elements. For example, a Business Entity may contain contacts and the contacts may contain addresses. Addresses may contain address lines and phone numbers. FIG. 13 illustrates schematically a UDDI concept of a relatively complex object in a Business Entity. The Business Entity object 131, includes, for example a number of attributes 132, such as AuthorizedName, BusinessKey, and Name. The Name has one or more Name fields 133, such as 'text' or this may be implicit in the 'Name' itself. There is also 'language'. There may be one or more of these fields 133.

How to provide for relatively rapid searching for a specific items contained in repeating elements.

How to represent UDDI information and requirements in hierarchy of Directory objects, How to manage deletion of UDDI objects and all their related information in an efficient manner, and How to optimize construction of intermediate search result collections during search operations so that both Directory access and iterative in-memory operations are minimized, taking into account the Directory storage medium limitations. In practice, Directory entries may be stored and returned in arbitrary order, and Directory results may be too large to sort.

How to represent the data concerning a Publisher Assertion, in an efficient way, How to create an efficient implementation of Publisher Assertions, particularly with regard to the implementation of the findrelatedBusiness method, How to implement efficient searching of Publisher Assertions by relationship, How to manage the validity of a Publisher Assertion, How to restrict the assertions created and deleted for a Business Entity are made by the owner of a Business Entity.

How to efficiently manage related collections of attributes, as defined in the UDDI standard, How to define attributes and objects to enhance the performance of searching.

Various UDDI Schema have been proposed. However, none are considered to address at least the problems noted above. For example, one schema provides a relatively simplistic mapping of UDDI objects to Directory objects, without necessarily having regard to the complexities and optimization to produce an efficient commercial implementation. It is also unclear how a number of the UDDI services (the find_series, in particular) can be implemented efficiently in such a schema.

For example, FIG. 14 illustrates schematically a Novell representation of a relatively complex object in a Business Entity. The Business Entity object 141, includes for example a number of attributes 142, each having a 'type' and 'value'. As illustrated, there is AuthorizedName having a value 'Bill', BusinessKey having a value '890.obale.890 . . . ', and Name having multi-values 143, 144 namely en# CA

IN# CATS

The UDDI (FIG. 13) and Novell (FIG. 14) example representations are not considered to be efficient representations for Web Services.

Thus, there is a need to address the general problems noted above as well as other problems to provide a relatively extensible, efficient and reliable implementation of UDDI based on a Directory.

SUMMARY

A method of generating keys for object(s) in a Web Services arrangement, comprises determining if an object has a defined first key and if the object has a defined first key, providing that defined first key for the object and if the object does not have a defined first key, providing a second key for the object.

A computer recording medium including computer executable code for generating keys for object(s) in a Web Services arrangement, comprises code for determining if an object has a defined first key, code for, if the object has a defined first key, providing that defined first key for the object and code for, if the object does not have a defined first key, providing a second key for the object.

BRIEF DESCRIPTION OF THE DRAWINGS

Further objects, advantages and aspects of the present disclosure may be better understood by reference to, the following description of preferred embodiments taken in conjunction with the accompanying drawings, in which:

FIG. 1a illustrates schematically some Web Services and UDDI concepts;

FIG. 1b illustrates schematically a simplified protocol stack for the Web Services environment;

FIG. 2 illustrates schematically a Hierarchy according to the related art;

FIG. 3 illustrates schematically a Directory Service Model according to the related art;

FIG. 4 illustrates schematically the infrastructure components for a UDDI Service Model implemented using X.500 Directory technology according to an embodiment of the present disclosure;

FIG. 5 illustrates schematically Service Projection, according to an embodiment of the present disclosure;

FIG. 6 illustrates schematically relationships between Binding Template and TModel, according to an embodiment of the present disclosure;

FIG. 7 illustrates schematically how a TModel creates a relationship between two entities, according to an embodiment of the present disclosure;

FIG. 8 illustrates a logical representation of a request to add a Publisher Assertion, according to an embodiment of the present disclosure;

FIG. 9 illustrates a logical representation of a constructor for UDDI data objects according to an embodiment of the present disclosure;

FIG. 10 illustrates schematically placing Business Entities objects under User object(s);

FIG. 11 illustrates schematically placing Domain objects over User object(s);

FIG. 12 illustrates schematically an outline of the schema according to an embodiment of the present disclosure;

FIG. 13 illustrates schematically a UDDI concept of a relatively complex object in a Business Entity according to the related art;

FIG. 14 illustrates schematically a Novell representation of a relatively complex object in a Business Entity;

FIG. 15 illustrates schematically the introduction of hierarchy in accordance with an embodiment of the present disclosure for the representation of a relatively complex object in a Business Entity;

FIG. 16 illustrates schematically a Binding Template hierarchy sub-structure according to an embodiment of the present disclosure;

FIG. 17 illustrates schematically a binding Template sub-structure flattened and/or merged; and FIG. 18 is a block diagram of a computer system capable of implementing various aspects of the present disclosure.

DETAILED DESRIPTION

In describing preferred embodiments of the present disclosure illustrated in the drawings, specific terminology is employed for sake of clarity. However, the present disclosure is not intended to be limited to the specific terminology so selected and it is to be understood that each specific element includes all technical equivalents which operate in a similar manner.

FIG. 18 shows an example of a computer system which may implement the method and system of the present disclosure. The system and method of the present disclosure may be implemented in the form of a software application running on a computer system, for example, a mainframe, personal computer (PC), handheld computer, server etc. The software application may be stored on a recording media locally accessible by the computer system, for example, floppy disk, compact disk, hard disk, etc., or may be remote from the computer system and accessible via a hard wired or wireless connection to a network, for example, a local area network, or the Internet.

An example of a computer system capable of implementing the present method and system is shown in FIG. 18. The computer system referred to generally as system 180 may include a central processing unit (CPU) 182, memory 184, for example, Random Access Memory (RAM), a printer interface 186, a display unit 188, a (LAN) local area network data transmission controller 190, a LAN interface 192, a network controller 194, an internal bus 196 and one or more input devices 198, for example, a keyboard, mouse etc. As shown, the system 180 may be connected to a data storage device, for example, a hard disk, 200, via a link 202.

The following summarizes some of the salient features of embodiments of the present disclosure and a few of the advantages provided thereby.

According to an embodiment of the present disclosure, a repository layer is created above users so each repository can be placed on a different server. This Repository layer includes one or more Directory nodes which collectively form the Directory pre-fix. This may also be known as 'Domain' or 'Name' of the Repository. An advantage of this is that it provides a single place to hold information about a domain. The name of this node represents the Directory prefix.

A user object may be created to hold the data representing a UDDI account. An advantage of this is that it provides a single place to hold information about a user/account.

Business Entity object(s) may be arranged under User object(s), Business Service object(s) under Business Entity object(s), and Binding Template object(s) under Business Service object(s). An advantage of this is that a repository or 'domain' layer above the user object layer enables a number of repositories to be posted or logically connected together. The domain layer may be arranged in a number of levels, for example having different countries, AU, US, EP, etc., organized by continent.

Another advantage is that this feature may be given effect by use of the Distribution features of an X500 Directory. For example, to implement this, a 'World', or 'Corporation' Node is placed at the top of the virtual Directory tree, and a uniquely named Node is placed at the top of each UDDI sub-tree (UDDI Name Space). While invisible to users, these 'Node' prefixes allow a UDDI repository to leverage Directory distribution.

According to an embodiment of the present disclosure, the Business Entity objects can be made a child of the user object. Having a user/account over the Business Entity, Business Service and Binding Template hierarchy gives the effect of each user having their own sub-tree. This enhances manageability and security. The user is readily restricted to modifying and/or controlling only their own sub-tree. This also enhances performance by making use of Directory sub-tree search operations According to an embodiment, TModels defined by a user can be made children of the user object, thus makes security easy to implement. This enhances manageability and security since the user can only modify and/or control their own sub-tree. It also enhances performance by making use of Directory sub-tree search operations.

An embodiment of the present disclosure represents a 'mapping' of the UDDI environment using X.500/LDAP Directory technology. In particular, the hierarchy structure of the X.500 and LDAP Directory technology has been found to be suitable to the UDDI environment. Careful design of additional elements (such as the user object) have made the hierarchy even more suitable to the needs of the UDDI environment.

Throughout the present disclosure, the term Directory is to include X.500, LDAP and similar technologies; the term 'Users' is understood to also include 'Accounts' and visa versa; and the term 'Repository' is understood to also include 'Directory Pre-fix', 'Domain' and or 'Node' and visa versa.

Web Services were originally envisaged to be services between organizations for example businesses, partners, customers, suppliers. In this context, UDDI was envisaged as a single repository for the services these organizations offer.

It is now apparent that Web Services and UDDI are useful within an enterprise to integrate applications inside an organization. It is also apparent that Web Services and UDDI can be used to integrate products inside a product set from a given vendor. It is also applicable outside the commercial environment, in areas such as government departments, large educational institutions, and many other instances of non-commercial entities.

The following description, although described with respect to an enterprise, has equal applicability to any type of environment and particular applicability to the above-mentioned types of environments.

An enterprise UDDI registry can be a service that can be deployed within the Enterprise to publish information and services for internal consumption. In addition, an Enterprise UDDI service may be leveraged to provide other functions, such as configuration discovery for distributed applications.

Web Services are being driven by the desire to quickly and easily integrate business processes, both internally and with partners. One component of using Web Services effectively is a public UDDI registry that enables software components to dynamically discover and connect to appropriate services across the Internet. Web Services also offer the promise of being able to integrate business processes within the Enterprise. In this case, the UDDI registry can become a piece of an organization's infrastructure (e.g., an important Enterprise application) and therefore provide the highest levels of security, performance, reliability and manageability. Directory technology provides an ideal foundation to support the stringent requirements of an Enterprise UDDI Registry.

An Enterprise UDDI registry can be defined as one that delivers Standards-compliant support for UDDI, but goes beyond it to address four areas for deployment. These areas include SECURITY to restrict access to authorized users only, DISTRIBUTION to support large deployments, MANAGEABILITY for a true production system and AVAILABILITY to meet service level agreements.

Strong security may be an important requirement for certain Enterprise deployments. A public UDDI registry exists for the sole purpose of helping anyone discover available services. An UDDI registry exists for the sole purpose of having the right people discover these services. This is an important distinction.

An Internet UDDI registry is considered inappropriate for deploying Web Services in an enterprise. For example, definitions of a Web Service that interfaces to a payroll system or to an employees' benefits management application would not be posted to an Internet UDDI Registry.

Security requirements may also mean that even an internally deployed UDDI registry provide strong access controls. This is because a UDDI registry essentially presents a tutorial on what can be done and how to do it. A UDDI registry provides a business-level description of any available Web Service and directions to the WSDL that completely define the programmatic interface to those services. This provides a high-productivity tool for application developers, as well as hackers.

Accordingly, it is desirable to restrict access to interface definitions for financially sensitive or confidential (such as medical records) systems. Even within the development organization, it may be wise to restrict access to information about specific Web Services to those authorized.

Using an unsecured UDDI registry within the enterprise, or with selected business partners through an extranet, could be extremely risky. Thanks to freely downloadable tools, people with relatively low levels of expertise can gain access to and use Web Services. Any true Enterprise solution can implement a standard UDDI service with the ability to transparently control access to information about Web Services.

With regard to DISTRIBUTION, in many cases, the initial deployments of UDDI registries will be on a small scale. However, as Web Services requirements grow, large deployments will become more common. In addition, registry usage and deployments will accelerate with the discovery of new functions for UDDI registries.

Larger implementations, and use within geographically distributed organizations, will drive implementation of multiple UDDI registries within a single organization. The evolution towards distributed registries makes it critical for any individual registry to be able to interact dynamically with other registries to service their requests. Once established, inter-registry communications could be extended beyond the firewall to include registries at trusted business partners, or even with Internet UDDI registries.

There are considered to be two basic approaches to addressing the needs for inter-registry communication. One approach is REPLICATION in which the same entry namespace exists on multiple servers. Another approach is DISTRIBUTION in which interconnected servers have different entry namespaces, yet they operate as one logical service.

Although these two approaches may often be confused as being similar, they are quite different.

In a REPLICATION approach, information is duplicated in every server that may need to look it up. This is a relatively simple, even simplistic, solution, but it introduces requirements to synchronize updates, and it will, by definition, increase network congestion as the number of registries and the volume of their contents grow. Replication techniques are best suited for environments where the number of servers is low, the volume of information is low and changes are infrequent. For enterprise deployments, replication is most useful to maintain backup repositories in a fail-over environment. Keeping geographically or functionally distributed servers synchronized is very difficult using replication techniques.

In a distribution approach, information is logically represented on each participating server, but only stored in a single registry. Queries are distributed to the other registries only as required. The information returned is thus guaranteed to be current. This provides a single point of update and eliminates the problems of synchronization and bandwidth consumption inherent with replication techniques. True distribution is considered to be one answer for scalable connectivity between servers.

For an Enterprise UDDI Registry, there are two scenarios in which distribution will generally be used. The first is for organizations with geographically separated offices, each generating new UDDI entries and consuming UDDI services. While it might be possible to run a single centralized UDDI registry, bandwidth restrictions and time zone differences frequently make this difficult to the point of being unworkable.

A distributed registry provides a flexible, scalable solution. In this scenario, each participating office has a separate registry, and each registry views the others as a logical part of its own content. The registry service takes care of all the connectivity details, and customers need not be concerned with geography.

The second scenario occurs when an enterprise needs to connect its internal UDDI system to that of a trusted partner, or public Internet registry. In the case of a public registry, in particular, replication is problematic. Internet registry operators may be unwilling to replicate parts of their registry to the enterprise's internal registry. Again, a distributed approach is one answer. At present, there are no UDDI Standards for distribution and the proposals for replication are considered complex. One solution would provide the benefits of a UDDI distributed approach without requiring modifications to the standard.

With regard to manageability, as a component performing mission-critical functions within an enterprise, UDDI should meet performance and reliability requirements. It should not just exist as a convenient utility for developers. Read access by clients will be the most frequent and most time-critical usage of a UDDI registry. Performance is optimized for maximum throughput, and the response times of lookup queries should not be affected by more complex searching. Performance should not suffer as the registry grows in size and complexity. The data store underpinning the UDDI Registry should be industrial strength and fully support transactions and automatic recovery in addition, the UDDI servers should have a high degree of availability and support features such as network fail-over and hot standby. System Administrators should have capabilities to make the UDDI registry easy to maintain, monitor and control. These capabilities include DYNAMIC CONFIGURATION to change controls, rules and settings without taking the service offline, ONLINE BACKUPS AND TUNING for high availability, ADMINISTRATIVE CONTROLS to stop "trawling" of the registry and prevent denial-of-service attacks, MONITORING via SNMP or other types of alerting mechanisms, AUDITING AND DIAGNOSTICS with separate log files for security, statistics, queries and update information and DEPLOYMENT options to support replication, distribution and routing.

Many developer-focused UDDI registries have been introduced. These provide useful capabilities for small development teams, but are not true production quality systems. Web Services deployments are growing rapidly and there is a corresponding need for an Enterprise-quality registry that can scale rapidly to support ongoing Web Service deployments.

A UDDI registry provides a service. This service will be relied on by many applications. In the case of on-line businesses, it may be important that this service be ever present. For example, a UDDI registry may be required to provide service level agreements of 99.99% availability. In order to facilitate this level of availability, the UDDI registry may be replicated across two or more machines, and mechanisms provided to make certain that the machines are kept synchronized, and that, should any of the machines become unavailable, any incoming queries are automatically routed to an available machine.

As has been pointed out, UDDI may be considered as effectively analogous to phone directory service. As such, the Directory model of information storage is a perfect base on which to build a UDDI registry service. The Directory model has been evolved and developed for the specific needs of Directory-based services, with the security, scalability and reliability needed for enterprise level deployment.

Most of the items described above are implemented at the service level, rather than at the data storage level, in application architecture. Relational databases (RDBMS) are generic toolkits upon which many different kinds of applications can be built. RDBMS implementations concentrate on providing solid data access functionality rather than extra service functions that are required in the end application.

The Directory Service architecture shown in FIG. 3 illustrates the separation of a Service Layer 31 from the other components. Encapsulating the interface functions into a Service Layer 31 results in reusable service infrastructure components. An excellent example of this is a web server. A web server provides a collection of functions (HTTP access, CGI processing and so on) that together make up a service useful enough to build into a standalone component. In the same way, the Directory Service model has been developed to supply the functions required by a specific type of application. Directory technologies provide the underpinning for many mission-critical applications in the area of authentication and authorization.

UDDI may be viewed as analogous to another kind of Directory Service. It may then be seen that many of the implementation problems posed by UDDI can be solved by using Directory technologies. For example, Directories are optimized for, extremely efficient find and search operations that are very common for UDDI phone Directory operations.

It has already been noted that a UDDI service should offer strong security, distribution and manageability capabilities if it is to be deployed successfully in the Enterprise. These are the very same attributes which have already been built into Enterprise-strength Directory Services solutions.

One way to construct an Enterprise UDDI registry is to extend the existing Directory infrastructure, which has been tried and tested in high-performance, real-world applications.

The Directory Services architecture provides the optimal vehicle to implement an Enterprise UDDI registry. This combination supports the capabilities necessary for success. The UDDI Service as illustrated schematically in FIG. 4 identifies components which may be implemented for this infrastructure. UDDI SEMANTIC BRIDGE 41 is a service component that mediates between the SOAP implementation 42 of UDDI and the LADP interface 43 supported by Directory 44. Directory 44 delivers information access with supporting security controls, distribution mechanisms, and administration capabilities. RDBMS 45 provides the underlying physical data management, transactional integrity and backup and recovery mechanisms.

UDDI registry products may be built directly on RDBMS technology. Relational Databases, although very useful and strong in many ways, do not by themselves meet the requirements unique to Directory processing It would be possible to build a Directory-type application from scratch, utilizing an RDBMS or other data storage system underneath. However, this may not be the most efficient approach.

An alternative approach is to apply the Directory Service model to deliver a UDDI registry and supply the functions required for this specific type of application. Even more functions required for a UDDI registry could be supplied by modern, industrial-strength Directory Services. A UDDI registry may be viewed as a Directory Service with specialized communications and APIs. Delivering UDDI services on a Directory could provide the requisite security, distribution and management capabilities without having to modify the UDDI Standards to gain the benefits.

A careful design of the data representation would be beneficial to give the functionality and performance required of a UDDI repository.

The following description refers to various UDDI concepts. A more detailed description of these UDDI concepts can be gained by reference to the UDDI specifications (http://www.uddi.org/specification.html).

A schema, in Directory parlance, is a description of the data elements that can be stored in the Directory, and how those elements may be connected together. This includes descriptions of each of the possible attributes (an attribute holds a single piece of data), descriptions of the various objects (an object is a collection of attributes), and specifications of the possible object hierarchies. The particular Schema notation used in this specification is the one used by eTrust Directory, a product of Computer Associates International Inc. 'eTrust' is a product name and trademark of Computer Associates International Inc. Of course, other Schema notations my be used.

The present disclosure describes a Schema used to implement a UDDI repository using a Directory as the data store. There are a number of concepts involved in this Schema. There are also a number of techniques used to enhance the operation of the UDDI implementation. The following is a brief description of some of these concepts. A more detailed description of these concepts and techniques will be described later below when describing embodiments of the present disclosure.

The present Schema is designed to provide optimized operation. The present Schema design, which includes the definition of Attributes, Object Classes, Entries and the Hierarchy, is embodied in a manner that enhances operation. The present Schema design provides significant advantages in, at least, security, performance, manageability, and distribution.

The hierarchy of the system will now be described. An X.500 Directory supports distribution internally, providing a distributed UDDI repository without any coding at the UDDI level. A level divides the contents of the repository. The (optional) domain level of this schema provides that level, each domain entry, and all of the entries below it, can be placed on a separate Directory server transparently to the UDDI-level programming. FIG. 11 illustrates an embodiment of this aspect of the present disclosure. This will be described in more detail later below.

According to an embodiment of the present disclosure, a user object is placed over the business and TModel objects. The user object provides a place for the storage of information relating to the user. It also provides an anchor point for all of the data published by the user. FIG. 10 illustrates an embodiment of this aspect of the present disclosure. This will be described in more detail later below.

Security is facilitated in this domain/user hierarchical system. A UDDI implementation can enforce that a user has control over their sub-tree of data objects.

Searching for user controlled entries is provided. Searching for data controlled by this user can be enhanced by using a sub-tree search under the user object.

It is possible to find a business by specifying, for example, a TModel that occurs in a Binding Template. This equates to "finding x by finding one (or more) of its children". In other words, a query may be "find all businesses which have a service which has a Binding Template which references this TModel". Such queries are done by finding the DN (Distinguished Name) of the descendent object, and discarding the unwanted levels, to yield the DN of the Business Entity. It is also possible to do duplicate elimination in this manner. This find feature comes about due to the hierarchical nature of the structure of the present disclosure.

Searching may be performed using attributes unique to an object class. This is an optimization that has two advantages. This simplifies the writing of searches, and yields superior performance through the elimination of 'weak' clauses. A 'weak' clause is a part of a filter that returns a large number of entries, or which refers to an attribute that is part of many entries. A design which used the same attribute name for every Name would have two choices when searching, for a Business Entity by name: it includes the object class in the search or filter the results of the search. The former is only possible if business names had a unique object class, and even so, object class is a weak clause, incurring more overhead.

The latter means extra code and the potential for returning a result list much larger than the desired result.

For example, consider a company called "McKenna's Testing Services" which offers a wide range of Web Services, all of which include "McKenna's" in their name—a search for business entities with "McKenna's" in their name would return intermediate results for all of the services as well. These intermediate results may be eliminated, but dealing with them reduces performance.

It is preferable to be able to specify an attribute name in a search and have that attribute name uniquely identify the object class being sought. To continue the example above, the search is much simpler if we can specify:
(euBusinessEntityName=McKenna's*)

Such a design produces strong searches, which are efficient because they are searching only the desired area. Strong searches include searches which return a small number of entries. The Directory can index the euBusinessEntityName attribute, and return results from that index—this produces good performance, and avoids handling unnecessary intermediate results.

For simple queries, such a design means that a search for a Business Entity name is a single clause, rather than the compound that might be necessary in another design. Imagine if the name attribute were called euName, and the Business Entity name object were called euBusinessEntityName. That would yield a search like:
(&(euName=McKenna's*)(oc=euBusinessEntityName))

There is an even more simple design, wherein all names are stored in the same object class. This means that the search reduces to (euName=McKenna's*) again, but now we wade through results for all names, trying to locate those which have a parent object that is a Business Entity—this last design would yield potentially poor performance, and rather more complex programming.

Shadow attributes may be used for case-sensitivity. It is far from trivial to provide both case-sensitive and case-insensitive searching using a single index. One option is to index case-insensitively, then scan the results case-sensitively. Another solution here is to index the original data case-sensitively, and to add a second attribute (in which the same data is stored) which is indexed case-insensitively. Then all that is required is to choose the appropriate attribute to search depending on the find qualifiers.

Every attribute in this design may be single-valued. This allows efficient indexing, higher performance, and stronger searches.

Using multi-valued attributes makes ambiguous searches possible. That is, it is possible to get search results which are counter-intuitive, and unintended. Imagine a multi-valued numeric attribute, called 'n', and an entry which contains this attribute with the values 2 and 5; this entry will be returned in response to a search (&(n<3)(n>4)), which is not something that would be readily anticipated.

Single-valued attributes are one of the techniques used for strong searches. A strong search is one which can eliminate the majority of candidate results through the index. Strong searches are a key to improved performance.

Aliases may be used for service projection. This is a significant benefit of using an X.500 Directory as the data store. A service projection can be represented neatly using an X.500 alias. This has the major advantage of guaranteeing data integrity. The alias accesses the original data, so any change to the original is instantly reflected by the alias. If the Directory implementation supports alias integrity, then when the original entry is deleted the alias vanishes without additional work.

Publisher Assertions are one of the least clearly defined elements in the UDDI Standard, and they require careful design. An inappropriate implementation could readily yield poor performance.

Because the most common use of Publisher Assertions is the find_relatedBusiness API, which is searching for all the completed Publisher Assertions relating to a specified Business Entity, it is good design to place each assertion under a Business Entity to which it refers.

By calculating the status of the assertion, and storing it in the assertion object, it is possible to restrict a search to completed Publisher Assertions. This means that the results returned will not contain spurious references that are to be removed.

Storing the relationship object as an auxiliary class allows the search to eliminate any assertion which has an unwanted relationship. If the relationship were stored as a child object, it would not be possible to write a single search that would address both the relationship and the assertion completion status.

UDDI keys may be used for naming where present. UDDI defines keys for many of the important object classes, and these keys are specified as being guaranteed to be unique. This means that the keys can be used as the naming attributes for the objects. Using the UDDI keys as the naming attributes means that there is no need to attempt resolution of naming clashes—that would be required if, for example, the default name were used as the naming attribute for a Business Entity.

Keys may be provided for naming where not present. That is, not all UDDI objects have defined keys. An example is Publisher Assertions. For these, the present system provides a key, using the same algorithm as is used for the UDDI-defined keys. This re-use of the idea means that code and structure written for the other objects can be re-used.

Where a series of UDDI objects are children of another object, and the order of the children is important (address lines, for example), the keys assigned to the child objects are arranged to be monotonically increasing in value, so that sorting on the keys yields the desired order. This simplifies the process of ensuring the desired order.

Where practical, it is desirable that keys vary in a little-endian manner. That is, the leftmost byte of the key varies most rapidly, because that yields the best performance of indexing in the X.500 Directory being used as the data store.

The UDDI Standards define a number of sub-structures inside some of the main object types. In many cases these sub-structures are optional, and may be repeated (they may occur zero, one, or more than one times in the same object). A simple example is the name sub-structure, containing a string (the name) and a language identifier. The X.500 schema definition does not support the use of structured attributes, so there is no immediately clear mapping of sub-structures. There are a few ways in which these sub-structures can be implemented in an X.500 schema.

One way is to concatenate the components of the sub-structure into a single attribute, using a separator of some kind to divide the various elements. This may not be the optimum design choice, because it loses the ability to index or search the components separately, and it adds processing complications to handling the data.

In the present system, the particular design used to represent sub-structures is chosen to maximise performance and manageability. The design disclosed may use one or more of a variety of techniques to represent sub-structures in a Directory. These techniques can be summarized in 3 categories.

One technique is that many of the sub-structures can be handled as child objects. Names are a good example: the Business Entity names are stored as children of the Business Entity. Another example is descriptions, where a separate Business Description object is a child of Business Entity objects. FIG. 15 provides an illustration of an embodiment of this aspect of the present disclosure and will be described in more detail below.

Another technique is flattening/merging. In cases where there may be at most one relationship to another object, the attributes may be combined into a single object. In this case, the hierarchy is said to be flattened because two objects have been combined into one object. A new object is said to be merged because the new object contains a combination of attributes from the combining objects. Preferably, the contents of the Relationship Object are promoted to the Parent Object.

For example, FIG. 16 illustrates schematically a representation of a UDDI relationship diagram. FIG. 17 illustrates schematically a Directory Hierarchy diagram where the Directory hierarchy has been formed by a flattening of the UDDI objects.

By way of explanation, FIG. 16 illustrates Object 161 having a relationship Object 162 to Object 163.

In accordance with an embodiment of the present disclosure, where there is a one-to-one relationship, a 'child' can be promoted. In other words, that part of the hierarchy can be collapsed or flattened and objects merged. The result is illustrated schematically in FIG. 17. The Parent Object 171 has contents A1, A2, An and has one or more children, Child Object 9n, with contents B1, B2, Bn, C1, C2 and Cn.

Another technique is splitting. For example, in one particular case (the OverviewDoc sub-structure), a sub-structure contains an unrepeated element and a repeated element. The unrepeated element (OverviewURL) can be moved into the parent, while the repeated element can be made a child object.

Another aspect of the present disclosure is management. Deleting a TModel hides it from find_TModel but does not remove it from the repository. Accordingly, to implement the correct handling of TModels, a hidden flag may be implemented. The presence of this flag indicates that a TModel (or user object) is hidden. The absence of the flag indicates that it is not. This will be the case for the vast majority of TModels, so this approach is efficient. No space is occupied in unhidden objects, and no indexing is used either. The Directory will index only those entries which do have the hidden attribute. This also means that the search for unhidden TModels will be fast and efficient.

The X.500 Directory used as a data store encourages a design which does not store empty values. For example, a (optional) value which is absent from the object is not stored in the Directory. This makes efficient use of storage space, and makes for stronger searches. Any search on an attribute need only consider those objects which have data for that attribute.

The data hierarchy of the present system matches well with the intent of the UDDI Standard. When a request arrives to delete a UDDI object, it maps directly to the deletion of a sub-tree in the Directory. For example, deleting a service includes deleting its names and descriptions, and all of its Binding Templates. All of these are children of the service entry in the Directory. Accordingly, the present system deletes the sub-tree from the service entry on down. This is readily implemented, and efficient.

A domain is a name representing the base of a hierarchical sub-tree. In X.500 terminology a domain is known as a context prefix. In LDAP terminology it is known as a suffix. Giving UDDI repositories a domain name allows use of true distribution (in the X.500 sense) of the data in the repository. The UDDI Standard only supports replication. By having the domain nodes, the present system can use Directory distribution facilities transparently to the application.

For example, assume that an Enterprise deploys UDDI internally, but has two development sites. With this facility, they can deploy a UDDI server at each site, with distribution allowing each site to transparently view items published on both registries.

An advantage of this is that it allows distribution 'for free'. For example, the UDDI server does not have to do any extra work and the Directory system effectively links together islands of information.

Nothing in the UDDI Standards dictates how the user information is stored. By creating user objects, all of the information relating to a user can be stored in a single object, and that object can be used as the root of the sub-tree holding all of the objects that the user publishes. This makes the definition of security much simpler. For example, if the object under consideration (be it business, service, or even TModel) is underneath the user's user object, then the user controls it.

UDDI defines objects that contain repeating elements. For benefits such as performance, searchability and manageability these repeating elements can be represented as child objects.

Storing repeating structured data as child objects allows representation of the data efficiently in a Directory, with each field individually available (and indexed) for searching.

For example, Business Entity names can be stored as children of the Business Entity object. Another example is Business Description which can be stored as children below Business Entity objects.

An advantage of this type of system is that it allows searching for a name (which is a common UDDI search), and the DN of the entry gives the DN of the object to which the name belongs.

UDDI defines redundant 'container' nodes (UDDI structures which contain only child sub-structures, rather than attributes). These can be removed because they can be constructed at relatively low cost from the results of a query. In some cases, attributes can be promoted from a child node to its parent, to remove the now-redundant child-node from the Directory representation.

For example, tModelInstanceDetails is not represented in the Directory schema as it contains no attributes. instanceDetails is not represented in the Directory schema as its attributes were promoted into the tModelInstanceInfo parent, as were the attributes of its child, overviewDoc. The category and identifier bags are not represented in the Directory, their contents are made children of the owner of the bag An advantage of this is that it reduces the number of entries in the Directory. In particular, it minimizes the depth of the DIT, which can improve performance.

FIG. 12 illustrates schematically a hierarchy structure according to an embodiment of the present disclosure. One or more Domain or Prefix 121 are provided. Under each Domain 121, there may be one or more Users 122. Under each User 122, there may be provided one or more TModel 123 and one or more Business Entity (BE) 124. Under each Business Entity 124, there may be provided one or more Publisher Assertion (PA) 125, one or more Business Service (BS) 126 and one or more Service Projection (SP). 127. Under each Business Service (BS) 126, there may be provided one or more Binding Template (BT) 128. Aliases can be placed a's required by a particular implementation. For example, Service Projection object(s) (shown as a triangle in FIG. 12) may stem as an alias from Business Entity object(s).

The advantages of this schema design as represented in FIG. 12 will become apparent from a reading of the present disclosure as a whole.

Publisher Assertions are placed under the business entities to which they refer because they are most frequently used in the context of a find_RelatedBusinesses call, which specifies a business key and is looking for all the businesses related to that one via Publisher Assertions. The present system locates the specified business, then reads all the Publisher Assertions underneath it (that are complete). This is a quick and efficient way of locating the relevant assertions.

An advantage of this is that it allows fast and efficient searches. It also allows easy maintenance of data integrity. For example, when a business is deleted, any Publisher Assertions are automatically deleted too.

TModels can be changed (or retired/hidden) by the user who published them. Placing them under the entry representing the user makes the security simple. For example, if the TModel lies in the sub-tree under the user entry, then it can be modified. If not, then it can not.

In more detail, if the DN (Distinguished Name) of the user trying to make the change matches a prefix of the DN of the TModel, the entry can be modified by that user, otherwise it can not. The Directory can be used to make this determination (Naming exception if the DN doesn't exist), or the UDDI server can do it.

When an object is deleted from the repository, the information associated with that object may also be deleted. This is greatly simplified by the hierarchical design used according to embodiments of the present schema. When the object is deleted, the entire sub-tree of which it is the root can be deleted, and this process can delete all (and generally only) the associated information. Deleting a sub-tree can be performed bottom-up. Each entry can only be deleted when all its children are deleted. This is managed by listing all the children in reverse DN order. This guarantees deletion of the children before their parents.

An advantage of this is that a sorted list method is an alternative to the more complex use of recursion Further, it is relatively simple and memory-efficient. When all the entries in the subtree are sorted by DN, and deletes are executed in reverse order, this guarantees that all children will be deleted before their parent.

For example, when a business service is deleted, the system deletes all the Binding Templates associated with it, their TModel instance information, and the various associated category information. All this can be deleted by deleting the sub-tree of which the business service is the root.

Due to the hierarchy used in the design of this schema, the DN of an object reveals the chain of ownership and control for an object. Note that inference is also dependent on careful choice of naming attributes.

An advantage of this is that it can reduce the number of searches or reads used to gather information. For instance, with search results which are child objects (such as names), the DN of each entry reveals the parent (e.g. the BusinessEntity) and the owning account.

For example, the DN of a business service reveals the business to which it belongs, and the user who controls it.

Directories do not guarantee any ordering of the result. When dealing with a complex result (such as a Business Entity and its business services, together with their appropriate names and descriptions), the construction of the output can be simplified by taking the results of the search and sorting them by DN. This organizes them so that the construction of the results becomes relatively simple. Each object is constructed before its children, so it is easy to place the children under their parent, so that the result for a business is organized before its services. All the children of an object appear before the next object of the same type, all of the services for one business before the next business appears. This also allows simple recursive construction, because the same thing applies at each level.

An advantage of this is that it minimizes the number of passes through a list of raw entries required to construct the UDDI structures.

For example, after sorting, the result for a business, A, is followed by a result for its first service, AA, that service's name, then A's second service, AB, and its names, then a second business, B.

A search can also be carried out on children. For example, a frequent search request may be "finding x by finding one (or more) of its children". One of the ways a business can be found by a search is by specifying, for example, a TModel that occurs in a binding template. In other words, the query is "find all businesses which have a service which has a binding template which references this TModel". These queries can be done by finding the DN of the descendent object, and chopping off the unwanted levels to yield the DN of the business entity. Advantageously, this also eliminates duplication. This search method comes about, in part, due to the hierarchy structure of embodiments of the present disclosure.

The use of guaranteed unique keys simplifies matters. The entire repository can be searched for a single key, and uniqueness will assure that there will either be no result (if that key is not present), or one result (if it is present). There is no need to be cautious about limiting searches within the range of a parent. This yields enhanced performance from the Directory, because it can use database indexes to their optimum.

An advantage of this is that it makes use of the fastest type of Directory queries. Another advantage is that the guaranteed unique names may be important if a given object is referenced from another.

A property of most indexing systems is that they are data dependent. If the data is "little endian" (the leftmost portion changes most rapidly) that data tends to be spread and so the indexes can give maximum performance. Conversely, if the data is repetitious, the indexes may not be very effective. A UUID (Universally Unique Identifier) algorithm can be used which exhibits "little endian" qualities. An advantage of this is that it maximises Directory performance.

Keys may be added to derived objects. Where a repeating data element is made into a child object, there is a need to add a naming attribute, which will form the last arc of its DN. In a Directory, the naming attribute is different from its siblings, since no two children of the same parent can have the same name.

Two kinds of keys may be used. For child objects which do not require order, UUIDs are used because these are guaranteed to be unique. Where order is important, keys with a monotonically increasing property are used to guarantee order.

In the UDDI Standard, a Business Entity can offer two kinds of services: those which it controls (represented in the repository by child objects), and those which it offers an interface to, despite the fact that they are provided by another Business Entity. The latter are represented in the disclosed UDDI repository by aliases. An alias provides exactly the right features. For example, if the original object (service) is altered in some way by its owner (perhaps another Binding Template is added), then the object referenced via the alias "changes" too. Moreover, any search under the Business Entity for a service will yield both real and aliased services.

For example, aliases can be used for Service Projection, where a Business can point to a Service defined under another Business.

An advantage of this is that leveraging aliases allows functionality that basically involves "an alternative name" to be automatically provided. Furthermore, if the Directory supports alias integrity, then if the original Service is deleted, any projections are automatically removed.

In the UDDI Standard there are a number of places in which we do not wish to have direct reference to another object, but rather an intermediate step—such as in the case of TModel instance information, or the references to business entities in a Publisher Assertion. In these cases, an alias would complicate the code. Accordingly, instead the present system may use a reference to the object. Because the present system, according to an embodiment, guarantees that every object has a unique key, then that key behaves exactly as a reference, sometimes known as a "foreign" key.

Attribute grouping can be performed using auxiliary object class. In handling Publisher Assertions there is a need for an ability to locate a Publisher Assertion using those three attributes which uniquely identify the Publisher Assertion: the two Business Entity keys, and the relationship between them. However, the relationship is specified, as a keyed reference, which is itself three different attributes: TModel key, key name, and key value. One way is to store this relationship as a child object of the Publisher Assertion. However, this may not allow the most efficient search for a specific Publisher Assertion. By making the relationship keyed reference an auxiliary class to the Publisher Assertion entry it is possible to search for all five attributes in a single search, and thus isolate exactly the Publisher Assertion objects required.

One design of this schema may use normal object-oriented design techniques, and yield, for example, all keyed references having the same attribute names. However, this design may make it more difficult and expensive to isolate, for example, a Business Entity category keyed reference, and to avoid confusing it with a TModel category keyed reference. It may also make it necessary to include object class terms in the filter and such terms are weak (highly repetitious in the repository).

Giving, for example, every different kind of keyed reference a different object class and different attribute names, means that any search for a particular attribute name necessarily implies the object class. It also means that the Directory server can construct an index that only has entries in it for the specific kind of entry desired. Such an index will be smaller and consequently faster.

For example, a search like: "euBusinessEntityName=Smith*" will consult the index for euBusinessEntityName, and so cannot be confused by an entry containing Smith in an attribute called euTModelName.

There may well be a call for tools outside the scope of the UDDI Standard. Such tools may need to provide means of access beyond those specified in the UDDI Standard. To allow for such tools, this present disclosure defines abstract classes which bind all the object classes that represent a single UDDI concept. This allows the definition of searches which can look at, for example, all names, or all keyed references.

For example, there is an abstract class euName which is the superclass of all the Name-type object classes, including euBusinessEntityName and euTModelName.

The UDDI Standard specifies that it be possible to search, for example, names in both case-sensitive and case-insensitive ways. This can be handled by indexing case-insensitively, and then retrieving the entries and checking them case-sensitively, but such an approach costs performance. It is preferable in these cases to define a shadow field which contains the same data, but is indexed differently. Similarly, shadow attributes can be used for variations in language, e.g. diacritical marks.

For example, the euBusinessEntityName object class contains two copies of each name. The first version is indexed case-insensitively, while the second is indexed case-sensitively. This allows the construction of a search filter which performs optimally no matter which behaviour is requested.

Every attribute (except object class) in this repository may be single-valued. This makes it possible for the Directory to construct more efficient indexes, and provide better performance in searching.

This also removes the possibility of false positive results in searching. For example, consider a search that looks for names which begin with "Fr", and end with "nk". One might expect this to yield (valid) entries with names like "Frank". If, however, name is made a multi-valued attribute, one may well get an invalid entry with two names like "Fred" and "Tink", because this one entry matches both criteria specified. By using single-valued names, each of which is a child object of the entry, the spurious matching of "Fred" and "Tink" is eliminated.

Operational attributes are special attributes that are managed by the UDDI application, but which are not seen by the user.

In the storage of UDDI data, it should be possible to have a way to distinguish TModels which are in-use from those which have been "retired". When a TModel is deleted, it may well still be used by many entries, so it cannot be truly deleted. Instead it is hidden, which means that it will not be returned as part of the results of a find_TModel call, but it can still be queried via a get_TModelDetail call. This is implemented by use of an attribute called euHidden, which is added to those TModels which are hidden. It may be beneficial and efficient to add a search step which eliminates any entry containing the euHidden attribute to any filter searching for TModels.

In Directory implementations it is considered generally very inefficient to have an attribute which is predominantly one value. For example, having a hidden attribute which is set to FALSE for 99% of the entries would produce poor performance—the index would be pretty much unusable.

What is considered much more effective is to have the majority of entries stored without the hidden attribute, and only add the attribute to those entries which are to be hidden. This has the additional benefit of not requiring the storage space to hold all those "FALSE" values. Now the filter for finding all those TModels which are not hidden becomes "(!(euTModel=*))"—which is a negation of an existence test, and existence tests are rapid, especially when the attribute only exists on a small fraction of the entries.

An embodiment of the present disclosure will now be described for resolving the implementation and UDDI Standard's issues in the context of a Directory. There are a number of elements to an X.500 schema. These elements include Attribute definitions, Object Class definitions and Name Binding definitions. An Attribute definition specifies a single data element, giving it a unique identifier (an OID), a name, and a data type. An Object Class definition specifies a collection of attributes which is manipulated as a whole. It gives a unique identifier (an OID), a name, and a list of attributes; the attributes may be required or optional. A Name Binding specifies part of a possible hierarchy. The Name Binding specifies one object class which may be stored under another, and specifies the attribute (or attributes) of the child that names the child object in this context.

There are a number of find qualifiers which impose additional design requirements. One find qualifier is case sensitivity for providing the ability to search for text data in both case-sensitive and case-insensitive manner efficiently. According to an embodiment of the present disclosure, case sensitivity can be resolved by providing additional fields in the objects, indexed differently.

According to this embodiment, the textual data is stored twice in an attribute of type caseExactString, and in an attribute of type caseIgnoreString. The find qualifier then determines which of the fields is searched, resulting in maximum performance.

For example, if a Business Entity has a name like "McKenna's Iron Foundry Services", then that string will be stored twice, once in a field that is indexed case-sensitively, and once in a field that is indexed case-insensitively—the stored data is the same, but the indices generated by the underlying Directory are different.

Another issue involves implementing service projections efficiently. According to an embodiment of the present disclosure, this can be solved using the X.500 alias facility. There are a number of ways in which service projections may be handled. This embodiment of the present disclosure handles them by way of Directory aliases. This is a particularly efficient way to implement them. It guarantees consistency of the projection with the base service, because the base service is accessed directly through the alias. It also guarantees that the projection will vanish the moment the base service is deleted, thus ensuring consistency.

For example, if a Business Entity called Williams Accounting Services publishes a Web Service called General Ledger Cross-Check, and it is desired to offer this same service under a second Business Entity called Williams Auditing Services, then this can be achieved by placing an alias entry under the second Business Entity. An inquirer enumerating the services offered by Williams Auditing Services will find the General Ledger Cross-Check service, just as it will find any services offered directly by Williams Auditing Services.

Another issue involves implementing keys efficiently. According to an embodiment of the present disclosure, this is resolved using UUIDs for external keys, and keys where order is unimportant. Sequential numbers may be used where order is important. Although keys are represented as strings, they are not truly text data. They are compared without sensitivity to case or diacritic marks.

Externally-visible keys follow one set of rules. When implementing a repository compliant with Version 2 of the UDDI specification they hold UUIDs, compliant to ISO-11578. When implementing a repository to Version 3 of the UDDI specification they hold key strings following the rules laid out in that version of the specification.

Note that keys used internally to link elements together follow another set of rules. Those where order is unimportant use UUIDs. Where order is important, sequential numbers are used.

For example, a keyed reference that represents an element of a category bag for a Business Entity called Williams Auditing Services, might reference a TModel with a key of 12345678-1234-1234-1234-1234567890ab (UDDI v2). The order of the keyed references in a category bag is unimportant, but the keyed reference requires a key to function as a naming attribute of the object. Thus we might generate a UUID key for this object, something like 87654321-4321-4321-4321-ba0123456789, and use that as the naming attribute in the Directory for this object.

Another issue is that data may be organized into domains if X.500 distribution is desired. This is resolved according to an embodiment of the present disclosure by creating a repository layer above users so each repository can be placed on a different server.

The UDDI Standard does not allow for the name space to be distributed. This means that multiple UDDI registries can co-operate with each other by replication or by transparently having the backend data store managing the distributed name spaces.

Distributed name spaces can be facilitated by each repository having a naming pre-fix. This pre-fix is a set of nodes that define a Domain. These nodes can be considered a repository layer above each UDDI registry. These nodes are placed above the user level.

FIG. 11 illustrates an example of such a node, called "Domain" 110. Domain 110 is the Directory pre-fix and may include one or more nodes up to the root. Below the Domain 110, this example illustrates the arrangement of a number of users 112, 113 and 114, for example. The number of Users arranged under a Domain 110 may vary according to the particular configuration and/or use of the present system. There may also be a number of domains arranged depending on the particular configuration and/or use of the present system. In the example below they are referred to as repository objects, suggesting that they represent separate physical repositories. Of course, this may not necessarily be the case, depending on the configuration and/or use of the present system.

The repository object requires a naming attribute, but that is all.

set object-class uddiObjectClass:400=

```
{   # repository - may be used to break users into groups
    name = euRepository
    subclass-of top
      must-contain
        euRepositoryName
};
```

Distribution is an important concept in large-scale Directory deployment, as it allows for data to be shared by multiple nodes without the massive bandwidth overhead and synchronization problems of replication.

In one embodiment, 'eTrust' UDDI supports distribution using the capabilities of the underlying eTrust Directory server, and in order for this to work the schema has been structured accordingly, with allowance for a virtual 'Domain' node(s) at the top of the tree hierarchy and unique Node identifiers or names at the top of each Node sub-tree (see UDDI schema description below).

Furthermore, an eTrust UDDI server can be made 'distribution-aware' through configuration. Two separate Directory prefixes can be specified—one for searching and reading, and another for Adding entries. To deploy a distributed server, the underlying eTrust Directory server agents are configured for distribution as per the eTrust Directory Admin Guide. Each separate eTrust UDDI node is configured with a unique Node name. The Search/Read prefix for each node is set to the 'World' or 'Corporation' node name. The Add prefix for each node is set to the unique name of that Node.

In this way, each Node adds entries to its own Directory repository but searches for entries across all Nodes via the distribution features of the X500 Directory.

An example of a repository object might be:

euRepositoryName=Melbourne

Another issue involves organizing the data which is held about the user. This can be resolved by creating a user object to hold the data.

Although there is no user object specified in the UDDI specification, such an object can be utilized according to an embodiment of the present disclosure. For example, a user object can be, among other things, a storage point for user credentials, and an anchor point for publishing.

FIG. 10 illustrates an example of such an arrangement, called 'User' 101. Below the user 101, this example illustrates the arrangement of other object(s), such as Business Entity object(s) 102, Business Service object(s) 103 and Binding Template object(s) 104. The number of Business Entity object(s) arranged under a user 101 may vary according to the particular configuration and/or use of the present system. There may also be a number of users arranged depending on the particular configuration and/or use of the present system.

The data elements held in the user object include the user key (used to provide a unique name for this user account), the user name, and the credentials (may be as simple as a password, or as complex as a PKI certificate). It may also contain an authorized name (identifying the person or role authorized to operate the user account). It may also contain a hidden flag used in handling the deletion of user accounts without losing any TModels defined by the user.

set object-class uddiObjectClass:401=

```
{   # user account
    name = euUserAccount
    subclass-of top
    must-contain
       euUserKey,
       euUserName,
       euCredentials
    may-contain
       euAuthorizedName,
       euHidden
};
```

An example of a user account object might be:

euU serKey=23456789-2345-2345-2345-234567890abc euUserName=Grace euCredentials=Amazing76sQ (it is assumed in this example, that a simple userid and password system has been implemented)

Another issue involves representing the data concerning a Business Entity (an object class described in the UDDI Standard), in an efficient way. This is resolved according to an embodiment of the present disclosure by representing unique fields as attributes of the object, and repeating elements as children.

The Business Entity object is a fundamental component of the UDDI Standard. Its content is defined by the standard, but many of its elements are repeating complex objects, which are not supported by X.500 schema. Such elements are represented by a hierarchical arrangement.

The only required element in a Business Entity is the business key. Optional elements include an authorized name, an operator, and a user key (this last will be present in a Business Entity published by a normal user).

set object-class uddiObjectClass:402=

```
{   # Business Entity - details of an entity which provides services
    name = euBusinessEntity
    subclass-of top
    must-contain
       euBusinessEntityKey
    may-contain
       euParentUserKey,
       euAuthorizedName,
};
```

The possible child objects of a Business Entity are: Name (an object containing the name string and language code, keyed for ordering); Description (an object containing the description string and language code, keyed for ordering); Contact (a complex object—described later below); Discovery URL (an object containing the URL string and use-type, keyed); Keyed Reference's which are marked as category or identifier information through choice of object class; and Business Services (described below)

An example of a Business Entity object might be:

euBusinessEntityKey=34567890-3456-3456-3456-34567890abcd euParentUserKey=23456789-2345-2345-2345-234567890abc Note that most of the apparent content of the Business Entity object is actually stored in objects that are direct children of the Business Entity object FIG. 15 illustrates an example of the introduction of a hierarchy into a sub-structure according to an embodiment of the present disclosure for the representation of a relatively complex object in a Business Entity. In FIG. 15, the multi-valued elements:

| For child 152 | |
| --- | --- |
| Language | en |
| Name | CA |
| For child 153 | |
| Language | IN |
| Name | CATS | are represented as children 152, 153 of the Business Entity 151. There may be none or more children.

Another issue to be resolved is representing the data concerning a Business Service (an object class described in the UDDI Standard), in an efficient way.

This can be resolved according to an embodiment of the present disclosure by representing unique fields as attributes of the object, and repeating elements as children.

The Business Service can be implemented in at least two ways. A first is that the Business Service represents a single conceptual service provided by the Business Entity, available through one or more access routes, each of which was represented by a Binding Template. A second is that the Business Service is a grouping mechanism for services, with the breakdown into individual services taking place at the Binding Template level. In either case, the data fields are defined in the UDDI specification.

The elements of a Business Service are the business and service keys. The business key specifies the Business Entity which owns the service. This is not necessarily the Business Entity under which it is discovered. A single service can be found under several business entities, by way of service projections. The service key is the unique identifier of the service throughout the UDDI repository. Both keys are represented as strings.

set object-class uddiObjectClass:403=

```
{   # business
    name = euBusinessService
    subclass-of top
    must-contain
        euBusinessServiceKey,
        euParentBusinessKey
};
```

There is no optional content of the Business Service object. All other content consists of potentially repeating elements, and so is represented as child objects. The potential child objects of a Business Service are: Binding Templates (see below); Name (an object containing a name string and a language code, keyed for ordering); Description (an object containing the description string and language code, keyed for ordering); and Keyed References marked as category information.

For example, a Business Service object might be:
euBusinessServiceKey=4567890a-4567-4567-4567-4567890abcde
euParentBusinessKey=34567890-3456-3456-3456-34567890abcd Note that most of the apparent content of the Business Service object is actually stored in objects that are direct children of the Business Service object.

Although, FIG. 15 illustrates an example of the introduction of a hierarchy into a sub-structure according to an embodiment of the present disclosure for the representation of a relatively complex object in a Business Entity, it is equally illustrative of an example of the introduction of a hierarchy into a sub-structure according to an embodiment of the present disclosure for the representation of a relatively complex object in a Business Service. The Business Entity 151 of FIG. 15 is equally applicable to a Business Service, with the multi-valued elements of the Business Service represented as children 152, 153 of the Business Service 151. There may be none or more children.

Yet another issue involves representing the data concerning a Binding Template (an object class described in the UDDI Standard.), in an efficient way. This is resolved according to an embodiment of the present disclosure by representing unique fields as attributes of the object, and repeating elements as children.

The Binding Template represents a way in which a particular service may be accessed. The only required elements of a Binding Template are its key and the key of the service to which it applies. Optional elements may include an access point or hosting redirector (the object should have exactly one of these). If an access point is present, then the access point type should also be present.

set object-class uddiObjectClass:404=

```
{   # binding template
    name = euBindingTemplate
    subclass-of top
    must-contain
        euBindingTemplateKey
    may-contain
```

```
        euParentServiceKey,
        euHostingRedirector,
        euAccessPoint,
        euAccessPointType
};
```

The possible child objects of a Binding Template are: TModel Instance Info (see below); and Description (an object containing the description string and language code, keyed for ordering)

An example of a Binding Template might be:
euBindingTemplateKey=567890ab-5678-5678-5678-567890abcdef
euParentServiceKey=4567890a-4567-4567-4567-4567890abcde
euAccessPoint=http://www.rsps.com.au/wsep
euAccessPointType=http.

Again, although FIG. 15 illustrates an example of the introduction of a hierarchy into a sub-structure according to an embodiment of the present disclosure for the representation of a relatively complex object in a Business Entity, it is equally illustrative of an example of the introduction of a hierarchy into a sub-structure according to an embodiment of the present disclosure for the representation of a relatively complex object in a Binding Template. The Business Entity 151 of FIG. 15 is equally applicable to a Binding Template, with the multi-valued elements of the Binding Template represented as children 152, 153 of the Binding Template 151. There may be none or more children.

Another issue involves representing the data concerning a TModel (an object class described in the UDDI Standard), in an efficient way. According to an embodiment of the present disclosure, this can be resolved by representing unique fields as attributes of the object, and repeating elements as children.

A TModel represents an idea. That idea might be, for example, a categorization system, requiring the specification of values which may be validated. Or it may be a specification of a data communication protocol. TModels are a flexible and powerful concept, and central to the ability of UDDI to represent complex data in a way that can be accurately queried.

The only required elements of the TModel object are a TModel key and a name. These are represented as strings.

The optional elements of a TModel object are an authorised name, an overview URL (part of an Overview Doc object), a user key, and a hidden flag.

A hidden flag is a an element of the handling of the TModel. The hidden flag is how the deleteTModel call is handled. When a TModel is "deleted" the hidden flag is added to the object. This means that the object will not be returned to a findTModel call, but will be accessible to getTModel calls.

set object-class uddiObjectClass:405=

```
{   # tmodel - a reference to an idea.
    name = euTModel
    subclass-of top
    must-contain
        euTModelKey,
        euTModelName
    may-contain
        euAuthorizedName,
        euOperator,
        euOverviewURL,
```

```
    euParentUserKey,
    euHidden
};
```

The possible child objects are: Description (an object containing the description string and language code, keyed for ordering); Keyed References marked as category or identifier information; and Overview Doc Description (an object containing the description string and language code, keyed for ordering)

An example of a TModel could be:

euTModelKey=uuid:67890abc-6789-6789-6789-67890abc-def1 euTModelName=Corporate QA Policy euOverviewURL=http://www.rsps.com.au/policy/qa.html euParentUserKey=23456789-2345-2345-2345-234567890abc Again, although FIG. 15 illustrates an example of the introduction of a hierarchy into a sub-structure according to an embodiment of the present disclosure for the representation of a relatively complex object in a Business Entity, it is equally illustrative of an example of the introduction of a hierarchy into a sub-structure according to an embodiment of the present application for the representation of a relatively complex object in a TModel. The Business Entity 151 of FIG. 15 is equally applicable to a TModel, with the multi-valued elements of the TModel represented as children 152, 153 of the TModel 151. There may be none or more children.

Another issue involves representing the data concerning a Publisher Assertion (an object class described in the UDDI Standard), in an efficient way.

According to an embodiment of the present disclosure, this can be resolved by representing unique fields as attributes of the object, and using an auxiliary class for the required relationship keyed reference.

A Publisher Assertion is an object representing a relationship between two business entities.

The required elements of a Publisher Assertion are its key, the to and from business and user keys, the status, and the relationship. The relationship is specified as a keyed reference, and stored as an auxiliary class to the Publisher Assertion entry. The status is stored as a string, but draws its possible values from the Completion, Status object. All the keys are represented as strings.

set object-class uddiObjectClass:406=

```
{    # publisher assertion - a relationship between two businesses
     name = euPublisherAssertion
     subclass-of top
     must-contain
       euPublisherAssertionKey,
       euFromBusinessKey,
       euFromUserKey,
       euToBusinesKey,
       euToUserKey,
       euPublisherAssertionStatus
}
```

There is no optional content in a Publisher Assertion, and there are no child objects.

An example of a Publisher Assertion might be:

euPublisherAssertionKey=7890abcd-7890-7890-7890-7890abcdef12 euFromBusinessKey=34567890-3456-3456-3456-34567890abcd euFromUserKey=23456789-2345-2345-2345-234567890abc euToBusinessKey=09876543-6543-6543-6543-dcba09876543 euToUserKey=98765432-5432-5432-5432-cba098765432 euPublisherAssertionStatus=status:complete

Note that there will be an auxiliary class associated with this entry; it will be of object class euPublisherAssertionRelationshipKeyedReference, and will specify the relationship that is being asserted between the two business entities named. An example might be:

euPublisherAssertionTModel=uuid:807A2C6A-EE22-470D-ADC7-E0424A337C03 euPublisherAssertionKeyName=wholly-owned subsidiary euPublisherAssertionKeyValue=parent-child Another issue involves representing the data concerning a keyed reference (an object class described in the UDDI Standard), in an efficient way. This is made more complex, by the need to be able to search efficiently for particular collections of keyed references: the category bag on a Business Entity, for example.

This is resolved according to an embodiment of the present disclosure by creating an abstract base class to represent keyed references, and subclass it for each of the desired collections. The collections do not have a representation in the Directory. For example, they exist as nothing more than a group of keyed references of the same subclass, existing as children of the same object. For example, the category bag of a Business Entity is the objects of class euBusinessEntityCategoryKeyedReference which are children of the specified Business Entity. Note that a Business Entity object can well have several keyed reference objects as children, with only their object classes making it clear which ones are part of the category bag and which are part of the identifier bag.

Keyed references are used in several places within the UDDI data model. They include a TModel key, a key name, and a key value. Two uses of keyed references are category bags and identifier bags. These bags are collections of keyed references, and are important to searching. If these bags were represented by objects containing undifferentiated keyed references, then it would be potentially quite difficult to implement efficient searching. This is why several subclasses of keyed references have been implemented. A category bag on a Business Entity is represented by one or more child objects of the class euBusinessEntityCategoryKeyedReference. This makes it easy to implement an efficient search for business entities with a specified keyed reference in their category bags.

The example below shows the abstract class and one of the derived classes, the euBus inessEntityCategoryKeyedReference, as discussed above. Note that the key to the keyed reference is inherited from the abstract class, while the TModel key, key name, and key value are all specified in the derived class, so they may have distinctive names for searching.

set object-class uddiObjectClass:201=

```
{    # abstract class as parent for all keyed references
     name = euKeyedReference
     subclass-of top
     must-contain
       euKeyed ReferenceKey
};
``` set object-class uddiObjectClass:301=

```
{   # Business Entity category keyed reference - collection makes up the
category bag
    name = euBusinessEntityCategoryKeyedReference
    subclass-of euKeyedReference
    must-contain
        euBusinessEntityCategoryTModel,
        euBusinessEntityCategoryKeyName,
        euBusinessEntityCategoryKeyValue
};
```

The contact is a complex object, representing a wide variety of information. Much like the Business Entity, a contact holds a variety of compound repeating elements, necessitating the use of child object classes.

The only data elements that are directly part of the contact object are a key, and the name of the person or role the contact represents. There is an optional use-type.

All the other possible elements are children of the contact object. These are: Address (parent of an ordered list of address-line objects, each with a key, use-type, sort,code, and TModel key); Phone (a phone number plus use-type); E-mail (an e-mail address plus use-type); and Description (description string plus language code)

Again, although FIG. 15 illustrates an example of the introduction of a hierarchy into a sub-structure according to an embodiment of the present disclosure for the representation of a relatively complex object in a Business Entity, it is equally illustrative of an example of the introduction of a hierarchy into a sub-structure according to an embodiment of the present disclosure for the representation of a relatively complex object in a contact object. The Business Entity 151 of FIG. 15 is equally applicable to a contact object, with the multi-valued elements of the contact object represented as children 152, 153 of the contact object 151. There may be none or more children.

Another issue involves representing the names and descriptions (specified in the UDDI Standard) in an efficient manner, and allowing rapid searching for a specific type of name or description.

According to an embodiment of the present disclosure, the system creates an abstract base class to represent names, and another to represent descriptions, and subclass them for each of the desired types. Search for the attributes of the subclass when looking for a specific type of name (Business Entity name, for example), and for the abstract class when looking for any name.

Several of the major objects (Business Entities, Business Services, etc) have the option of multiple names and descriptions. The reasons are manifold. It is not uncommon for a business to be known by multiple names, perhaps one formal and one or more colloquial. Moreover, a business may use different names in different languages. It is not uncommon for a name to translate badly, for example. For example, the computer firm Fujitsu used the name Facom in English-speaking countries for many years. The issue may exacerbated in languages with multiple character sets. A Japanese firm may well have one version of their name in katakana, and another version in hiragana.

For these reasons and more, both name and description objects may occur multiple times for a single object. Each instance is tagged with a language code. In UDDI version 3 there may be multiple instances with the same language code (this is not allowed in version 2).

Find qualifiers add further confusion. As mentioned earlier, UDDI searches are required to support both case-sensitive and case-insensitive searching, and this is best handled by storing the data twice in the X.500 Directory.

The example below shows the abstract class and one of the derived classes, euBusinessEntityName, used for the collection of names of a Business Entity:
set object-class uddiObjectClass:202=

```
{   # abstract class as parent for all names
    name = euName
    subclass-of top
    must-contain
        euNameKey
    may-contain
        euLanguage
};
``` set object-class uddiObjectClass:331=

```
{   # name of a Business Entity
    name = euBusinessEntityName
    subclass-of euName
    must-contain
        euBusinessEntityNameValue,
        euBusinessEntityNameValueIC
    # inherits euNameKey and euLanguage from euName
};
```

Note that the euBusinessEntityNameValue is the attribute that contains the case-sensitive version of the name; while the euBusinessEntityNameValueIC is the version marked as "ignore case", and is thus case-insensitive. The euNameKey field, inherited from the abstract class, is used to control the ordering of the names, and provides a unique naming attribute.

An example of a name object might be:
euNameKey=890abcde-890a-890a-890a-890abcdef123
euLanguage=EN
euBusinessEntityNameValue=McKenna's Validation Systems
euBusinessEntityNameValueIC=McKenna's Validation Systems Again, although FIG. 15 illustrates an example of the introduction of a hierarchy into a sub-structure according to an embodiment of the present disclosure for the representation of a relatively complex object in a Business Entity, it is equally illustrative of an example of the introduction of a hierarchy into a sub-structure according to an embodiment of the present disclosure for the representation of a relatively complex object in an abstract class. The Business Entity 151 of FIG. 15 is equally applicable to an abstract, with the multi-valued elements Of the Binding Template represented as children 152, 153 of the abstract class 151. There may be none or more children.

Another issue relates to creating an efficient implementation of the requirement that a user be permitted to alter only those business entities under his/her control. According to an embodiment of the present disclosure, this can be achieved by making the business entities controlled by a user's children of the user object. This makes security more,easily implemented.

It may be important to ensure that a publishing user only be permitted to alter the information that he/she owns. It is possible to do this with various designs. However, the optimal design makes it immediately clear whether a user is authorised to publish an item: all the data controlled by a given user is located in that user's subtree.

This design decision has no impact on the ease of access to business entities as a whole, because all inquiries into business entities can be conducted from above the user level in the hierarchy without loss of generality or performance.

Another issue relates to creating an efficient implementation of Publisher Assertions, particularly with regard to the implementation of the findRelatedBusiness method. According to an embodiment of the present disclosure, this can be achieved by making the Publisher Assertions relating to a business children of the business object. This eliminates the need to search for that criterion.

One primary use of Publisher Assertions lies in the find_RelatedBusinesses inquiry. This inquiry specifies a particular Business Entity, and requests information about all business entities related to that entity by completed Publisher Assertions. This inquiry is simplified, and accelerated, by a hierarchy which places the Publisher Assertions under the Business Entity to which they relate. This has the added benefit of increasing consistency. When a Business Entity is deleted all the associated Publisher Assertions (now irrelevant) are deleted with it.

Another issue relates to creating an efficient implementation of the requirement that a user be permitted to alter only those TModels under his/her control. According to an embodiment of the present disclosure, the system makes the TModels, defined by a user, children of the user object. This makes security easy to implement.

For reasons similar to those that governed the placing of business entities under user entries, it is sensible to place user-defined TModels under the user entry of the user who defines them. There is no detrimental impact on locating the TModels, since they can be located via a single indexed access, because all TModels are uniquely named.

Another issue relates to implementing efficient searching of Publisher Assertions by relationship. According to an embodiment of the present disclosure, this can be achieved by making the relationship keyed reference an auxiliary class of the Publisher Assertion entry. If the keyed reference were a child (one implementation) it could not be searched with equal efficiency, and searches for the relationship could not be combined with searches on the content of the Publisher Assertion, such as the (critical) filter on status (only completed assertions are considered).

The X.500 schema system may not support the construction of object classes that include other object classes as data elements. For example, a keyed reference can not be a data element of a Publisher Assertion. It is possible to make the keyed reference a child of the Publisher Assertion, but this does not facilitate the construction of an efficient search that references the contents of the keyed reference.

Making the keyed reference an auxiliary class to the Publisher Assertion entry is an efficient solution to the problem. It is then possible to search on the content of the keyed reference as though it were part of the assertion.

As described above, an example of a Publisher Assertion might be:
euPublisherAssertionKey=7890abcd-7890-7890-7890-7890abcdef12
euFromBusinessKey=34567890-3456-3456-3456-34567890abcd
euFromUserKey=23456789-2345-2345-2345-234567890abc
euToBusinessKey=09876543-6543-6543-6543-dcba09876543
euToUserKey=98765432-5432-5432-5432-cba098765432
euPublisherAssertionStatus=status:complete
euPublisherAssertionTModel=uuid:807A2C6A-EE22-470D-ADC7-E0424A337C03
euPublisherAssertionKeyName=wholly-owned subsidiary
euPublisherAssertionKeyValue=parent-child The auxiliary object class is euPublisherAssertionKeyReference, and the last three attributes listed above are the data elements of that class.

According to an embodiment of the present disclosure, a Directory such as eTrust™ Directory by Computer Associates may be utilized to implement an ideal enterprise UDDI registry platform. eTrust Directory, which is a fully compliant LDAPv3, X.500 electronic Directory, can be used to underpin a UDDI Web Services implementation. The 'eTrust' Directory allows the UDDI implementation to leverage the highly mature Directory solution that is well proven in large-scale, business-critical Directory service applications.

There are many unique features of 'eTrust' Directory that make it extremely attractive as a platform on which to build a UDDI registry. Some of these include: Security features including access control policies, roles, secure proxy, mutual authentication, distributed authentication, distributed SSL certificate subject verification and network address validation; Distribution and routing capabilities including parallel-distributed searches, load sharing, query streaming and shortest path routing; A multi-master replication scheme that combines the speed and efficiency of replay-based mechanisms (known as multi-write) with state-based recovery and reconciliation techniques; Availability features including hot swap of data-bases, network fail-over and Directory System Agent (DSA) fail over; Caching design that is considered fast; and Deployment features including dynamic configuration (of data types, schema rules, security, knowledge and so on), unlimited data size, general information integrity rules, extensive administrative controls and an interactive command console.

eTrust Directory provides a proven X.500 Directory solution. On top of this proven foundation can be implemented a UDDI Semantic Bridge to enable a fully Standards-compliant UDDI Registry. Because of the capabilities of the underlying Directory solution, the embodiments disclosed herein can deliver flexible security, distribution and manageability without requiring changes or extensions to the existing UDDI Standards.

One issue of the present embodiment deals with how to map relationships between entities stored in disparate sections of the Directory.

While UDDI data structures are primarily hierarchical, there may be a problem with cross relationship between different objects.

There are essentially two categories of relationships, namely alternative names, and cross relationships. According to an embodiment of the present disclosure, the problem is resolved by making use of the concept of Aliases to address the alternative names. Essentially this has the effect to 'attach' a foreign entity as a virtual child of the primary entity.

The present embodiment makes use of unique keys to address the problem of cross relationships. Essentially this has the effect of creating 'relationship pointers' rather like the Primary/Foreign key system in RDBMS technology to model relationships between data entities that exist between disjoint sub-tress within a hierarchical Directory system.

The use of aliases according to embodiments of the present disclosure will now be described. A first scenario is most clearly demonstrated by the implementation of UDDI Business Service Projections. A Business Service projection is in effect an alternative name for a Business Service. A Business Service Projection is a Business Service which appears to belong to Business A, but which is in fact owned and defined by Business B.

Referring to FIG. 5, Business Service 51, a Service owned by Business A, appears also to belong to Business B. Any changes made by Business A to Business Service 51 will be reflected in the projected Service appearing under Business B. Similarly, if Business Service 51 is deleted from the registry, it will no longer appear under either Business A or Business B. Additionally, Business Entity B may not edit or change Business Service 51. For editing and all other Publishing purposes, only Business A has access to Business Service 51.

A Directory Alias system can be utilised to achieve this effect. An alias of Business Service 51 is added to Business Entity B. The alias is a special marker for the Directory server which says in effect 'when someone looks at this alias, show them this other entry over here'.

It means that when the original Service is edited, the changes will be visible in the projection as well. If the Directory system supports Alias integrity, which is the case with eTrust Directory, if the service is deleted, the projection will automatically be removed as well.

In addition, the Directory server can be configured to show the projected Business Service twice when it is searched for, once under each parent. This can be useful when doing searches which need to resolve the parents of a Business Service.

Some situations require that objects in disjoint parts of the Directory hierarchy maintain a relationship.

An example of this is between Binding Templates and TModels. TModels are used throughout UDDI for various purposes. They are categorization keys, search identifiers, (UDDI) relationship descriptors, and in this instance, technical specification 'fingerprints'. A TModel which is 'attached' to a BindingTemplate describes a technical specification to which that BindingTemplate (see FIG. 8) conforms. For example, a publisher might attach a TModel asserting that their Binding Template conforms to the SOAP 1.1 Standard.

A registry typically contains a finite set of TModels, many of which will be referenced by hundreds or even thousands of Binding Template entries. In some cases the registry will return the details of any 'attached' TModels with the details of the BindingTemplate.

According to this embodiment of the present disclosure, a primary/foreign key system such as that utilized in relational database system can be suitably modified and applied. Every TModel stored in the registry has its own unique (primary) key. A Binding Template references a TModel by adding a local (foreign) key which matches the unique key of the required TModel. FIG. 7 illustrates an example of this. The server can then look up the TModel in question if TModel data is needed to be returned with the Binding Template.

FIG. 6 shows the relationships between a Binding template and TModel.

FIG. 7 shows how the TModel key creates the relationship between the two entities.

A Publisher Assertion is an important element of a UDDI repository. As noted above, it provides users with the ability to discover which business entities are related to a Business Entity of interest, and how they are related.

The Publisher Assertion was designed to protect against abuse, with an asserted relationship only becoming visible when the owners of both business entities involved had asserted the relationship. This protection comes at a cost, in that it complicates the implementation, and necessitates careful design to avoid poor performance.

One problem is integrity. A Publisher Assertion has a more complex lifecycle than any other UDDI construct. It comes into being when the owner of a Business Entity makes an assertion about that business and its relationship to another Business Entity. The owner of the other Business Entity can request a status report and discover what assertions have been made about their businesses, or they may be notified out-of-band. Either way, the owner of the other Business Entity can choose to make a matching assertion about the relationship between the two business entities. At that moment the assertion is complete, and visible to users calling findRelatedBusinesses. One or both assertions can be modified or deleted, and the assertion becomes incomplete again, and should no longer be visible. Additionally, the deletion of either Business Entity should immediately remove the assertion.

The Publisher Assertion objects may be managed in a manner that maintains integrity of the assertion.

It is desirable that the owner of a Business Entity be able to make (and remove) assertions about the business entities controlled by that owner.

This embodiment of the present disclosure is predicated upon the assumption that the UDDI repository will be a "read-mostly" store, much as intended for an x.500 Directory. To this end, the design is optimized for better read performance, even at the cost of imposing a heavier burden on writes.

An object class called Publisher Assertion is designed to hold data beyond that required by the UDDI Standard, because of the desirability to optimize search performance. The design introduces an operational attribute, which defines the Publisher Assertion status. The status of the assertion is determined at the time of writing to the Directory and in this way need not be determined each time a search is performed.

The present embodiment also uses Pointers in the form of User Keys. When a Publisher Assertion is written to the Directory the user keys for the "to" and "from" businesses are determined and written into the object. This simplifies the getAssertionStatusReport query, because all that is required to generate such a report is to search for a Publisher Assertion that contains the user key of the person who is generating the report.

In contrast, there would be considerable effort required to generate the report if it was necessary to query all the business keys under the user, then look for Publisher Assertions containing those business keys.

One common use of Publisher Assertions is for the discovery of those businesses 'related' to a given business. To provide good performance for that query, the Publisher Assertion(s) relating to a business are placed as child node(s) of the business.

In addition, the status of each assertion is recorded in the assertion as an operational attribute. This makes it is possible to query just the Publisher Assertions with a status of complete located beneath the company of interest. This simplifies the search for findRelatedBusinesses because the search will recall only those assertions which are complete.

To simplify security, all businesses controlled by a user and their Publisher Assertions may be child nodes under that user's account entry. This implementation enforces access control by only allowing a User access to the sub-tree under the User's account entry.

Note that the operational attribute representing the status is managed by the UDDI implementation. When a user publishes an assertion which has already been asserted by another asserted business, the UDDI implementation will update the status of the other assertion, which is in another sub-tree controlled by the User of the other business. The access controls allow for this.

As an alternative embodiment to storing two Publisher Assertion objects, one under each of the two Business Entities involved, a single Publisher Assertion object is provided in it's own sub-tree. For example, the Publisher Assertion sub-tree can be provided under Repository object(s). When the assertion is initially stored in this case, it is given an incomplete status (for example, tokeyincomplete or fromkeyincomplete, depending on which side asserted it). If the Publisher Assertion is asserted by a complementary user, the status is changed to complete. If the Publisher Assertion is deleted by one of the two, then the status is changed back to incomplete. If the Publisher Assertion is deleted by both sides, then the Publisher Assertion object is deleted. Advantageously, this results in just one copy of an assertion, and most of the maintenance work consists of doing a modify of the single attribute that holds the status of the assertion.

FIG. 12 illustrates schematically a hierarchy according to an embodiment of the present disclosure. The schematic illustrates both alternatives, where the Publisher Assertion object is placed under Business Entity and/or Repository object.

FIG. 8 illustrates a method to request to add a Publisher Assertion. In Step S80, a determination is made whether the request is valid. If not valid (No, Step S80), the request fails (Step S92). If the request is valid (Yes, Step S80), a determination is made whether the request is from business ours (Step S82). If it is not from business ours (No, Step S82), a determination is made whether it is to business ours (Step S84). If not to business ours (No, Step S84), the request fails (Step S92). If it is to business ours (Yes, Step S84), a determination is made whether the assertion is made by from owners (Step S86). If the assertion is not made by from owner (No, Step S86), an incomplete assertion is written (Step S94). If the assertion is made by from owner (Yes, Step S86), the complete assertion is written (Step S96). Returning to Step S82,m if it is determined that the request is from business ours (Yes, Step S82), a determination is made whether it is to business ours (Step S88). If not to business ours (No, Step S88), a determination is made whether the assertion is made by to owner (Step S90). If the assertion is not made by the to owner (No, Step S90), the incomplete assertion is written (Step S94). If the result of Step S88 is Yes (To business ours), or the result of Step S90 is Yes (assertion made by To owner), the complete assertion is written (Step S96).

The next issue deals with how to optimize construction of intermediate search result collections during search operations so that both Directory access and iterative in-memory operations are minimized, taking into account the Directory storage medium limitations. In practice, Directory entries may be stored and returned in arbitrary order, and Directory results may be too large to sort.

According to an embodiment of the present disclosure, an object-oriented in-memory data storage system coupled with a unique result sorting scheme which sorts intermediate results by Distinguished Name is provided. This allows one search to return many different types of objects—BusinessEntities, BusinessServices, etc—and still allows the system to easily construct the correct XML structure for returning the data to the user. It is to be noted that Web Service interactions are in XML.

A description of such a system will now be described. A UDDI BusinessEntity and any child data elements in the present disclosure are represented (partially) in the Directory according to the following hierarchy: BusinessEntity BusinessService
   BindingTemplate
   BindingTemplate
   ServiceName
   ServiceName
BusinessService
   BindingTemplate
   BindingTemplate
   ServiceName
   ServiceName
BusinessName
BusinessName
BusinessDescription
BusinessDescription Note that ServiceName, BusinessName and BusinessDescription have been described in relation to aspects of the present disclosure dealing with Substructures and Object Splitting.

The BusinessEntity retrieval code performs a Directory SubTree search based upon the unique key of the required Business Entity or business entities. This search will return the entries found, plus all sub-entries. The Directory Standards do not guarantee any particular order to the returned entries—or even that sub-entries will immediately follow their parent entry.

Therefore, the retrieval code then sorts the returned entries by Distinguished Name. This guarantees that sub-entries will be ordered after their parents, and that parent-child relationships can easily be distinguished. A variety of sorting algorithms can be used. The sorting algorithm used should exhibit characteristics of high performance in the case where entries are partially sorted.

The algorithm for results construction is essentially in operation a 'depth-first, left-to-right tree-walk'. It is otherwise known in graph theory as a 'postorder traversal'.

The sorted list is passed to the constructor method of a new BusinessEntity object. This object may be, for example, an object-oriented programming construct designed to represent a UDDI Business Entity. The BusinessEntity object contains the code to 'construct itself' from the data provided in the entry last. The code moves iteratively through the list, making decisions about each entry. It is understood that the first entry in the list should be the main entry for the Business Entity itself, and as soon as it finds another BusinessEntity it is understood that construction has finished—the ordering of the list guarantees this. As soon as it finds a BusinessService or other child entry, an object of the appropriate type is instantiated and the list is passed to the new object's constructor, along with a pointer telling it where to start in the list.

Each object contains essentially similar processing code to handle construction of itself and delegate construction of any child entries to appropriate child objects.

In this way, only a single Directory search need be performed, and the resulting list is handled in an efficient fashion, with every entry being processed once. If the list was left in an arbitrary order, or sorted in some other fashion, the list would have to be processed in multiple passes to correctly construct a UDDI hierarchy from the resulting entries.

Delegation of construction and list processing to the different programming objects in the hierarchy keeps the processing code to a comparatively small size, making it more efficient and ultimately faster.

FIG. 9 illustrates programming constructs (objects), including a representation of the sorted entry list. A determination is made whether there are any further items in a list of items. If there are no additional items (No, Step S100), the process exits (Step S118). If there are additional items (Yes, Step S100), the next item in the list is retrieved (Step S102). A determination is then made whether the item is of this object type. If the item is of this object type (Yes, Step S104), the object attributes are set based on the item (Step S106) and the process returns to Step S100. If it is not of this object type (No, Step S104), a determination is made whether an item of this object type has been processed yet (Step S108). If the item of this object type has not yet been processed (No, Step S108), the process returns to Step S100. If an item of this object type has been processed (Yes, Step S108), a determination is made whether the item is an intrinsic component of this object (e.g., Name, Description, etc.). If it is an intrinsic component (Yes, Step S110), the item is added to the object attribute and extra processing may be performed (Step S112) and the process returns to Step S100. If it is not an intrinsic component (No, Step 110), a determination is made whether the item is a child object of this object (e.g., BusinessService if this is a BusinessEntity). If it is a child object (Yes, Step S114), the system instantiates an object of the correct type, and passes the list of items to a constructor (Step S116) and the process returns to Step S100. If it is not a child object (No, Step S114), the process returns to Step S100.

As the present disclosure may be embodied in several forms without departing from the spirit of the essential characteristics of the disclosure, it should be understood that the above described embodiments are not to limit the present disclosure unless otherwise specified, but rather should be construed broadly within the spirit and scope of the disclosure as defined in the appended claims. Various modifications and equivalent arrangements are intended to be included within the spirit and scope of the disclosure and appended claims.

What is claimed is:

1. A method of generating keys for object(s) in a Web Services arrangement, comprising:
   storing, by a computer system, at least one object based on at least one of a plurality of Universal Description, Discovery and Integration (UDDI) objects as an entry in a directory, the directory comprising a hierarchical organization of a plurality of entries, each of the plurality of entries having a plurality of attributes;
   determining, by the computer system, if the at least one object has a defined first key;
   if the at least one object does not have a defined first key:
      determining, by the computer system, whether the at least one object is to be stored in the directory in a particular order in relation to other objects having an identical hierarchical level as the at least one object;
      generating, by the computer system, a second key that is monotonically increasing if it is determined that the at least one object is to be stored in the directory in the particular order, and if it is not determined that the at least one object is to be stored in the directory in the particular order, then generating, by the computer system, a second key using a UUID (Universally Unique Identified) algorithm; and
      providing, by the computer system, the second key for the at least one object as the naming attribute for the entry corresponding to the at least one object in the directory, the second key uniquely identifying the entry in the directory.

2. The method as recited in claim 1, wherein each key is unique.

3. The method as recited in claim 1, wherein each object of the plurality of UDDI objects has at least one of a defined key and a second key.

4. The method as recited in claim 1, wherein the plurality of UDDI objects comprises a Business Entity object, a Business Service Object, a Binding Template Object, a Publisher Assertion Object, and a TModel object.

5. The method as recited in claim 1, wherein the second key generated using the UUID algorithm varies in a little-endian manner.

6. A computer recording medium including computer executable code for generating keys for object(s) in a Web Services arrangement, comprising:
   code for storing at least one object based on at least one of a plurality of Universal Description, Discovery and Integration (UDDI) objects as an entry in a directory, the directory comprising a hierarchical organization of a plurality of entries, each of the plurality of entries having a plurality of attributes;
   code for determining if the at least one object has a defined first key;
   code for, if the at least one object has a defined first key, providing that defined first key for the object as a naming attribute for the entry corresponding to the at least one object in the directory, the defined first key uniquely identifying the entry in the directory; and
   code for, if the at least one object does not have a defined first key:
      determining whether the at least one object is to be stored in the directory in a particular order in relation to other objects having an identical hierarchical level as the at least one object;
      generating a second key that is monotonically increasing if it is determined that the at least one object is to be stored in the directory in the particular order, and if it is not determined that the at least one object is to be stored in the directory in the particular order, then generating a second key using a UUID (Universally Unique Identified) algorithm; and
      providing the second key for the at least one object as the naming attribute for the entry corresponding to the at least one object in the directory, the second key uniquely identifying the entry in the directory.

7. The computer recording medium as recited in claim 6, wherein each key is unique.

8. The computer recording medium as recited in claim 6, wherein each object of the plurality of UDDI objects has at least one of a defined key and a second key.

9. The computer recording medium as recited in claim 6, wherein the plurality of UDDI objects comprises a Business Entity object, a Business Service Object, a Binding Template Object, a Publisher Assertion Object, and a TModel object.

10. The computer recording medium as recited in claim 6, wherein the second key generated using the UUID algorithm varies in a little-endian manner.

* * * * *